(12) United States Patent
Li et al.

(10) Patent No.: US 12,376,103 B2
(45) Date of Patent: Jul. 29, 2025

(54) REPORTING FOR INFORMATION AGGREGATION IN FEDERATED LEARNING

(71) Applicant: QUALCOMM INCORPORATED, San Diego, CA (US)

(72) Inventors: Qiaoyu Li, Beijing (CN); Yu Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 18/040,253

(22) PCT Filed: Sep. 10, 2020

(86) PCT No.: PCT/CN2020/114408
§ 371 (c)(1),
(2) Date: Mar. 17, 2023

(87) PCT Pub. No.: WO2022/051964
PCT Pub. Date: Mar. 17, 2022

(65) Prior Publication Data
US 2024/0023091 A1    Jan. 18, 2024

(51) Int. Cl.
H04W 72/1268 (2023.01)
H04L 5/00 (2006.01)
H04W 72/231 (2023.01)

(52) U.S. Cl.
CPC ....... H04W 72/1268 (2013.01); H04L 5/0053 (2013.01); H04W 72/231 (2023.01)

(58) Field of Classification Search
CPC .............. H04L 5/0053; H04W 72/231; H04W 72/1268
(Continued)

(56) References Cited

U.S. PATENT DOCUMENTS

2018/0088566 A1*  3/2018  Billi-Duran ...... G05B 19/41885

FOREIGN PATENT DOCUMENTS

| CN | 111369042 A | 7/2020 |
| CN | 111401552 A | 7/2020 |
| WO | WO-2018061576 A1 | 4/2018 |

OTHER PUBLICATIONS

China Mobile: "Ki #2, Sol #24: Resolving the ENs", 3GPP TSG-WG SA2 Meeting #140E, S2-2006243, Aug. 19-Sep. 1, 2020, Elbonia, 5 Pages, The Whole Document.
(Continued)

*Primary Examiner* — Peter G Solinsky
(74) *Attorney, Agent, or Firm* — Holland & Hart LLP/Qualcomm

(57) ABSTRACT

Methods, systems, and devices for wireless communications are described. In some systems, a base station and multiple user equipment (UEs) may participate in a federated learning operation in which each UE may transmit an unencoded uplink signal to the base station indicating one or more parameters associated with updating a local model at the UE. The base station may aggregate and average the received parameters to update a global model at the base station. Additionally, each UE that transmits an unencoded uplink signal may transmit reporting information associated with the unencoded uplink signal indicating that the unencoded uplink signal is transmitted or that a downlink control information was received. The base station may use the reporting information to determine an averaging value with which to average the aggregation of the received parameters.

30 Claims, 20 Drawing Sheets

(58) Field of Classification Search
USPC .......................................................... 370/329
See application file for complete search history.

(56) References Cited

OTHER PUBLICATIONS

International Search Report and Written Opinion -PCT/CN2020/114408—ISA/EPO—Jun. 10, 2021.

\* cited by examiner

REPORTING FOR INFORMATION AGGREGATION IN FEDERATED LEARNING

CROSS REFERENCE

The present Application is a 371 national stage filing of International PCT Application No. PCT/CN2020/114408 by Li et al. entitled "REPORTING FOR INFORMATION AGGREGATION IN FEDERATED LEARNING," filed Sep. 10, 2020, which is assigned to the assignee hereof, and which is expressly incorporated by reference in its entirety herein.

FIELD OF TECHNOLOGY

The following relates to wireless communications, including reporting for information aggregation in federated learning.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support resource allocation for over-the-air model aggregation in federated learning. In some wireless communications systems, a user equipment (UE) may be configured to transmit data to a network device (e.g., an edge server, a remote parameter server, a base station, etc.). In such systems, the transmitted data may include parameters or gradients associated with updating a local data model (e.g., an artificial intelligence or machine learning model) at the UE, and the network device may aggregate data from multiple UEs to generate a global data model. In some cases, multiple UEs may transmit data to the network device across a shared channel (e.g., a multiple access channel) as part of an over-the-air computation procedure, which may be equivalently referred to as an air computation procedure or an AirComp procedure. In such cases, the data transmitted by the UE to the network device may be unencoded (e.g., the UE may use unencoded analog modulation). As part of the over-the-air computation procedure, the network device may detect energy based on a combination of the data transmissions from the multiple UEs and may determine updated parameters or gradients by averaging the total energy detected based on a quantity of the multiple UEs. In effect, the feedback from multiple UEs may be combined as the feedback is transmitted over the same resources at the same time. The network device may be configured to interpret the aggregated information by averaging the received signals by some parameter based on the quantity of UEs that transmitted information or other information.

In some implementations of the present disclosure, a UE may provide reporting information to accompany the data sent to the network device to indicate to the network device that the UE transmits the data or to indicate that the UE successfully received a control message, such as a downlink control information (DCI) message, scheduling the transmission of the data. The network device may more accurately determine the quantity of the multiple UEs that are transmitting data over the shared channel based on receiving the reporting information and, as such, may more accurately determine updated parameters or gradients from the multiple UEs (e.g., based on using a more accurate averaging denominator). The network device may configure the UE with a resource allocation that the UE may use for providing the reporting information using various signaling messages or configurations, and the reporting information may function as or include an acknowledgement (ACK) that the UE transmits data over the shared channel or an ACK that the UE successfully received the DCI message, or may include an indication of a portion of the data that was not sent (in examples in which the UE truncates or otherwise refrains from transmitting a portion of the data to the network device). For example, the UE may use coefficients associated with information (e.g., parameters or gradients) to send the data to the network device and, in examples in which the UE transmits a portion of the data, the UE may include an indication of one or more coefficient indexes that were not (or that will not be) transmitted to the network device in the data.

As such, the network device may determine a quantity of UEs that transmit data to the network device over one or more portions of the shared channel or a quantity of UEs that transmit partial data to the network device (and what portion of such partial data is truncated, or both), and may determine a more accurate value to use for averaging the energy detected over the shared channel over which the multiple UEs are scheduled to transmit the data. Accordingly, the network device may more accurately determine the parameters or gradients related to the local machine learning operations at the multiple UEs and likewise update a global machine learning operation with the more accurate parameters or gradients.

A method of wireless communication at a UE is described. The method may include receiving, from a base station, a DCI message scheduling a first message transmitted using an unencoded uplink signal from the UE to the base station, where the unencoded uplink signal is associated with a concurrent transmission with other unencoded uplink signals for averaging information while the unencoded uplink signal is transmitted, transmitting, using the unencoded uplink signal, the first message to the base station based on receiving the DCI message, and transmitting, using an encoded uplink signal, a second message to the base station associated with the first message, the second message indicating that the DCI message was received.

An apparatus for wireless communication at a UE is described. The apparatus may include a processor, memory coupled with the processor, and instructions stored in the memory. The instructions may be executable by the processor to cause the apparatus to receive, from a base station, a DCI message scheduling a first message transmitted using an unencoded uplink signal from the UE to the base station, where the unencoded uplink signal is associated with a concurrent transmission with other unencoded uplink signals for averaging information while the unencoded uplink signal is transmitted, transmit, using the unencoded uplink signal, the first message to the base station based on receiving the DCI message, and transmit, using an encoded uplink signal, a second message to the base station associated with the first message, the second message indicating that the DCI message was received.

Another apparatus for wireless communication at a UE is described. The apparatus may include means for receiving, from a base station, a DCI message scheduling a first message transmitted using an unencoded uplink signal from the UE to the base station, where the unencoded uplink signal is associated with a concurrent transmission with other unencoded uplink signals for averaging information while the unencoded uplink signal is transmitted, transmitting, using the unencoded uplink signal, the first message to the base station based on receiving the DCI message, and transmitting, using an encoded uplink signal, a second message to the base station associated with the first message, the second message indicating that the DCI message was received.

A non-transitory computer-readable medium storing code for wireless communication at a UE is described. The code may include instructions executable by a processor to receive, from a base station, a DCI message scheduling a first message transmitted using an unencoded uplink signal from the UE to the base station, where the unencoded uplink signal is associated with a concurrent transmission with other unencoded uplink signals for averaging information while the unencoded uplink signal is transmitted, transmit, using the unencoded uplink signal, the first message to the base station based on receiving the DCI message, and transmit, using an encoded uplink signal, a second message to the base station associated with the first message, the second message indicating that the DCI message was received.

In some examples of the method, apparatuses, and non-transitory computer-readable medium described herein, transmitting the second message to the base station may include operations, features, means, or instructions for transmitting an ACK associated with the first message, the ACK indicating that the first message was transmitted.

In some examples of the method, apparatuses, and non-transitory computer-readable medium described herein, transmitting the second message to the base station may include operations, features, means, or instructions for transmitting an ACK associated with the DCI message, the ACK indicating that the DCI message was received.

In some examples of the method, apparatuses, and non-transitory computer-readable medium described herein, transmitting the second message to the base station may include operations, features, means, or instructions for transmitting one or more coefficient indexes associated with information included in the first message.

Some examples of the method, apparatuses, and non-transitory computer-readable medium described herein may further include operations, features, means, or instructions for determining that one or more coefficients associated with information included in the first message were not transmitted to the base station, where the second message includes an indication of one or more coefficient indexes corresponding to the one or more coefficients that were not transmitted to the base station.

Some examples of the method, apparatuses, and non-transitory computer-readable medium described herein may further include operations, features, means, or instructions for truncating the one or more coefficients from the first message based on a power limitation of the UE, where determining that the one or more coefficients were not transmitted to the base station may be based on truncating the one or more coefficients from the first message.

Some examples of the method, apparatuses, and non-transitory computer-readable medium described herein may further include operations, features, means, or instructions for determining a resource allocation for transmitting the second message based on receiving the DCI message, where transmitting the second message to the base station may be based on determining the resource allocation.

Some examples of the method, apparatuses, and non-transitory computer-readable medium described herein may further include operations, features, means, or instructions for transmitting, to the base station, a scheduling request associated with the second message, and receiving, from the base station, an indication of the resource allocation for transmitting the second message based on transmitting the scheduling request, where determining the resource allocation may be based on receiving the indication of the resource allocation.

Some examples of the method, apparatuses, and non-transitory computer-readable medium described herein may further include operations, features, means, or instructions for transmitting, to the base station, a medium access control (MAC) control element (MAC-CE) associated with the second message, and receiving, from the base station, an indication of the resource allocation for transmitting the second message based on transmitting the MAC-CE, where determining the resource allocation may be based on receiving the indication of the resource allocation.

In some examples of the method, apparatuses, and non-transitory computer-readable medium described herein, determining the resource allocation for transmitting the second message may include operations, features, means, or instructions for determining the resource allocation based on the DCI message.

In some examples of the method, apparatuses, and non-transitory computer-readable medium described herein, determining the resource allocation for transmitting the second message may include operations, features, means, or instructions for determining an uplink resource based on a configuration.

In some examples of the method, apparatuses, and non-transitory computer-readable medium described herein, the resource allocation includes a resource element group corresponding to the UE.

In some examples of the method, apparatuses, and non-transitory computer-readable medium described herein, the resource allocation includes a resource of a physical uplink control channel (PUCCH) or a resource of a physical uplink shared channel (PUSCH), or a combination thereof.

In some examples of the method, apparatuses, and non-transitory computer-readable medium described herein, transmitting the second message may include operations, features, means, or instructions for transmitting a first part of the second message over a first set of resources, and transmitting a second part of the second message over a second set of resources.

Some examples of the method, apparatuses, and non-transitory computer-readable medium described herein may further include operations, features, means, or instructions for receiving an indication of the second set of resources based on transmitting the first part of the second message over the first set of resources, where the first part of the second message indicates a size of the second part of the second message.

In some examples of the method, apparatuses, and non-transitory computer-readable medium described herein, the first part of the second message includes an indication of a quantity of one or more coefficients associated with information of the first message and the second part of the second message includes one or more coefficient indexes corresponding to the one or more coefficients.

In some examples of the method, apparatuses, and non-transitory computer-readable medium described herein, the unencoded uplink signal includes an over-the-air computation signal.

In some examples of the method, apparatuses, and non-transitory computer-readable medium described herein, the unencoded uplink signal may be transmitted without applying an error correcting code.

A method of wireless communication at a base station is described. The method may include transmitting, to a UE, a DCI message scheduling a first message transmitted using an unencoded uplink signal from the UE to the base station, where the unencoded uplink signal is associated with a concurrent transmission with other unencoded uplink signals for averaging information while the unencoded uplink signal is received, monitoring a first resource allocation for the first message transmitted using the unencoded uplink signal based on transmitting the DCI message, monitoring a second resource allocation for a second message transmitted using an encoded uplink signal from the UE to the base station, and determining a value for averaging a set of unencoded uplink signals based on monitoring the second resource allocation for the second message.

An apparatus for wireless communication at a base station is described. The apparatus may include a processor, memory coupled with the processor, and instructions stored in the memory. The instructions may be executable by the processor to cause the apparatus to transmit, to a UE, a DCI message scheduling a first message transmitted using an unencoded uplink signal from the UE to the base station, where the unencoded uplink signal is associated with a concurrent transmission with other unencoded uplink signals for averaging information while the unencoded uplink signal is received, monitor a first resource allocation for the first message transmitted using the unencoded uplink signal based on transmitting the DCI message, monitor a second resource allocation for a second message transmitted using an encoded uplink signal from the UE to the base station, and determine a value for averaging a set of unencoded uplink signals based on monitoring the second resource allocation for the second message.

Another apparatus for wireless communication at a base station is described. The apparatus may include means for transmitting, to a UE, a DCI message scheduling a first message transmitted using an unencoded uplink signal from the UE to the base station, where the unencoded uplink signal is associated with a concurrent transmission with other unencoded uplink signals for averaging information while the unencoded uplink signal is received, monitoring a first resource allocation for the first message transmitted using the unencoded uplink signal based on transmitting the DCI message, monitoring a second resource allocation for a second message transmitted using an encoded uplink signal from the UE to the base station, and determining a value for averaging a set of unencoded uplink signals based on monitoring the second resource allocation for the second message.

A non-transitory computer-readable medium storing code for wireless communication at a base station is described. The code may include instructions executable by a processor to transmit, to a UE, a DCI message scheduling a first message transmitted using an unencoded uplink signal from the UE to the base station, where the unencoded uplink signal is associated with a concurrent transmission with other unencoded uplink signals for averaging information while the unencoded uplink signal is received, monitor a first resource allocation for the first message transmitted using the unencoded uplink signal based on transmitting the DCI message, monitor a second resource allocation for a second message transmitted using an encoded uplink signal from the UE to the base station, and determine a value for averaging a set of unencoded uplink signals based on monitoring the second resource allocation for the second message.

Some examples of the method, apparatuses, and non-transitory computer-readable medium described herein may further include operations, features, means, or instructions for determining the second resource allocation for the second message transmitted using the encoded uplink signal from the UE to the base station based on transmitting the DCI message, where monitoring the second resource allocation for the second message may be based on determining the second resource allocation.

Some examples of the method, apparatuses, and non-transitory computer-readable medium described herein may further include operations, features, means, or instructions for receiving an ACK included in the second message from the UE indicating that the first message was transmitted based on monitoring the second resource allocation for the second message, where determining the value for the averaging may be based on receiving the second message.

Some examples of the method, apparatuses, and non-transitory computer-readable medium described herein may further include operations, features, means, or instructions for receiving an ACK included in the second message from the UE indicating that the DCI message was received based on monitoring the second resource allocation for the second message, where determining the value for the averaging may be based on receiving the second message.

Some examples of the method, apparatuses, and non-transitory computer-readable medium described herein may further include operations, features, means, or instructions for receiving, as part of the second message, an indication of one or more coefficient indexes corresponding to one or more coefficients associated with information included in the first message, where determining the value for the averaging may be based on receiving the indication of the one or more coefficient indexes.

In some examples of the method, apparatuses, and non-transitory computer-readable medium described herein, monitoring the second resource allocation for the second message may include operations, features, means, or instructions for failing to receive the second message from the UE over the second resource allocation, where determining the value for the averaging may be based on failing to receive the second message.

Some examples of the method, apparatuses, and non-transitory computer-readable medium described herein may further include operations, features, means, or instructions for receiving, from the UE, a scheduling request associated with the second message, determining the second resource allocation for the second message based on receiving the scheduling request, and transmitting, to the UE, an indication of the second resource allocation for the second message based on determining the second resource allocation.

Some examples of the method, apparatuses, and non-transitory computer-readable medium described herein may further include operations, features, means, or instructions for receiving, from the UE, a MAC-CE associated with the second message, determining the second resource allocation for the second message based on receiving the MAC-CE, and transmitting, to the UE, an indication of the second resource allocation for the second message based on determining the second resource allocation.

In some examples of the method, apparatuses, and non-transitory computer-readable medium described herein, monitoring the second resource allocation for the second message may include operations, features, means, or instructions for monitoring for, from the UE, a first part of the second message over a first set of resources, and monitoring for, from the UE, a second part of the second message over a second set of resources.

Some examples of the method, apparatuses, and non-transitory computer-readable medium described herein may further include operations, features, means, or instructions for transmitting, to the UE, an indication of the second set of resources based on receiving the first part of the second message over the first set of resources, where the first part of the second message indicates a size of the second part of the second message.

In some examples of the method, apparatuses, and non-transitory computer-readable medium described herein, the first part of the second message includes an indication of a quantity of one or more coefficients associated with information of the first message and the second part of the second message includes one or more indexes corresponding to the one or more coefficients.

In some examples of the method, apparatuses, and non-transitory computer-readable medium described herein, transmitting the DCI message scheduling the first message may include operations, features, means, or instructions for transmitting an indication of the second resource allocation.

Some examples of the method, apparatuses, and non-transitory computer-readable medium described herein may further include operations, features, means, or instructions for receiving the set of unencoded uplink signals from a set of UEs, and determining the averaging of the set of unencoded uplink signals based on the value.

In some examples of the method, apparatuses, and non-transitory computer-readable medium described herein, the first resource allocation or the second resource allocation includes a resource element group, the resource element group corresponding to the UE.

In some examples of the method, apparatuses, and non-transitory computer-readable medium described herein, the first resource allocation or the second resource allocation includes a resource of a PUCCH or a resource of a PUSCH, or a combination thereof.

In some examples of the method, apparatuses, and non-transitory computer-readable medium described herein, the unencoded uplink signal includes an over-the-air computation signal.

DETAILED DESCRIPTION

Figure 1:
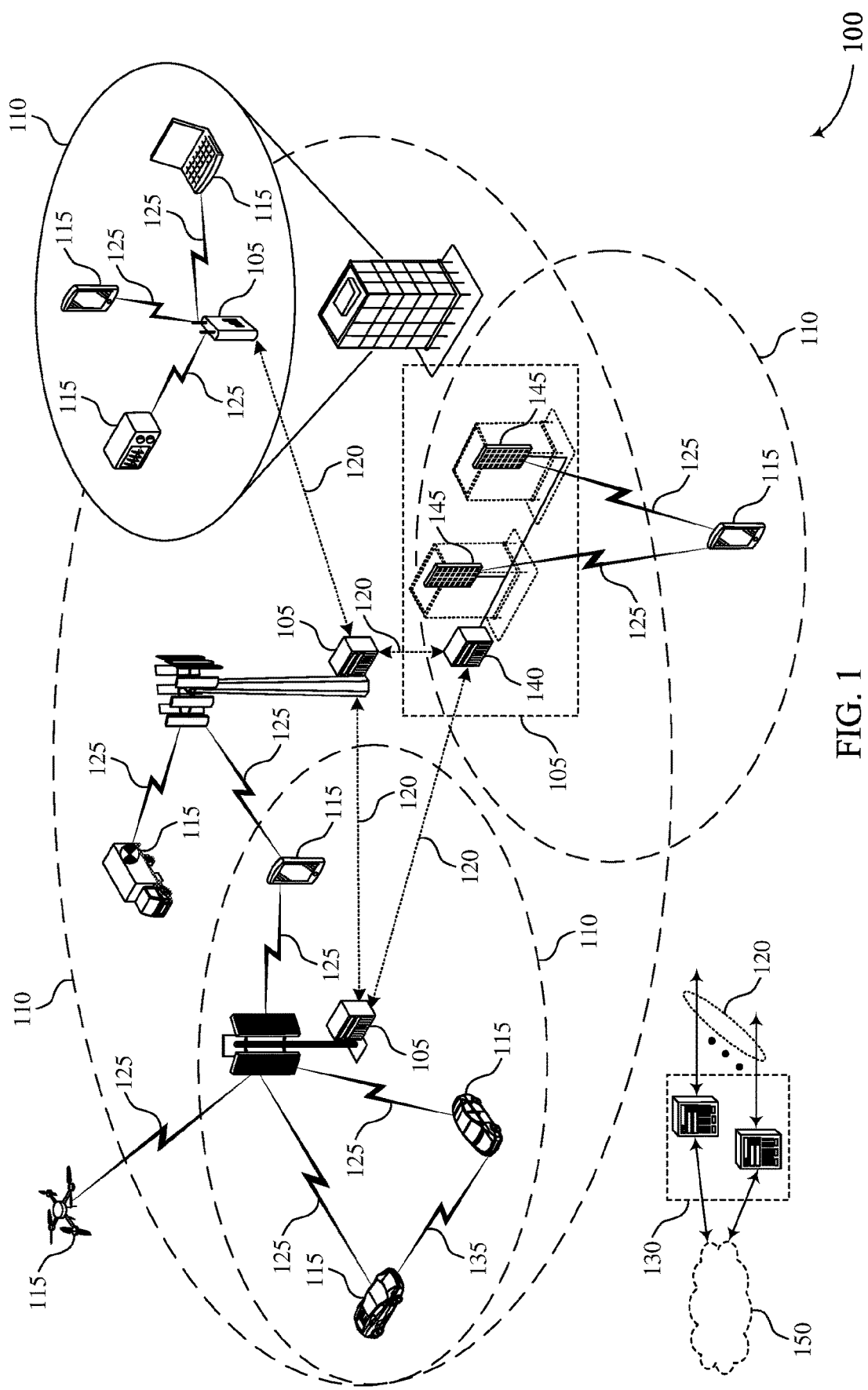
FIG. 1 illustrates an example of a wireless communications system that supports reporting for information aggregation in federated learning in accordance with aspects of the present disclosure.

In some wireless communications systems, a user equipment (UE) may be configured to transmit data to a network device (e.g., an edge server, a remote parameter server, a base station, etc.). In such systems, the transmitted data may include parameters or gradients associated with updating a local data model (e.g., an artificial intelligence or machine learning model) at the UE, and the network device may aggregate data from multiple UEs to generate a global data model as part of a federated learning operation. In some cases, multiple UEs may transmit data to the network device across a shared channel (e.g., a multiple access channel) as part of an over-the-air computation procedure, which may be equivalently referred to as an air computation procedure or an AirComp procedure.

In such cases of over-the-air computation, the data transmitted by the multiple UEs to the network device may be unencoded (e.g., the multiple UEs may use unencoded analog modulation) over the same resources (e.g., the same frequency and time resources). As part of the over-the-air computation procedure, the network device may detect energy (or other parameters of the received signal) based on a combination of the data transmissions from the multiple UEs and may determine the aggregate data from the multiple UEs. the network device may average the total energy detected based on a quantity of the multiple UEs to better interpret the feedback information received from the set of UEs. In some cases, however, the network device may be unaware of how many UEs actually provide their data to the network device over the allocated shared channel resources. For example, the network device may schedule each of the multiple UEs to transmit data to the network device over the shared channel resources via a control message, such as a downlink control information (DCI) message. As such, the network device may be unaware of which UEs successfully receive the control message or of which UEs may have limited their data transmission based on device-specific constraints (such as a power limitation of a UE or low fading gain). As such, the network device may assume that all of the scheduled UEs transmit data over the shared channel resources and may likewise determine an averaging value that also assumes that all of the scheduled UEs transmit data over the shared channel resources. In cases in which some UEs fail to receive the control message or in which some UEs transmit partial data, however, such an assumption may be inaccurate and may result in the determination of inaccurate aggregate data at the network device.

Various aspects of the present disclosure provide techniques for UEs to transmit reporting information accompanying their unencoded data transmissions. As described herein, an unencoded data transmission may be referred to as a first message and such reporting information accompanying the unencoded data transmission may be referred to as a second message. In some implementations, a UE may transmit the second message (the accompanying reporting information) using an encoded signal, as opposed to the unencoded signal that the second message is associated with. A UE may transmit the second message to indicate that the UE successfully received the scheduling control message or to indicate that the UE transmits its scheduled first message (including the parameters or gradients associated with updating a local data model of the UE), or both.

In some examples, the second message may include an acknowledgement (ACK) that the DCI message was received or that the UE transits data over the scheduled shared channel resources. In such examples, the network device may determine that the UE transits data over the scheduled shared channel resources based on receiving the ACK from the UE. Such use of an ACK may be maintain simplicity and reduce overhead in examples in which the UE completely transmits its first message. In examples in which the UE transmits a portion of its first message, the UE may additionally or alternatively include, in the second message, an indication of one or more coefficients associated with information included in the first message (e.g., coefficients associated with the data relating to the parameters or gradients) that are not transmitted in the first message. In such examples, the UE may transmit an indication of one or more coefficient indexes (corresponding to the one or more coefficients that are not transmitted) in the second message. According to the implementations described herein, the UE may provide both an ACK and an indication of one or more coefficient indexes that are not transmitted in the first message via the second message, may provide an ACK or an indication of one or more coefficient indexes that are not transmitted in the first message via the second message (but not both), or may separately provide both an ACK and an indication of one or more coefficient indexes that are not transmitted in the first message (e.g., via a second message and a third message).

Particular implementations of the subject matter described in this disclosure can be implemented to realize one or more of the following potential advantages. In some implementations, the described techniques can be used to provide, from a UE to a network device, reporting information associated with an unencoded message to enable the network device to determine a more accurate value for averaging unencoded signals provided by multiple UEs over a common shared channel resources. As such, the network device may determine more accurate aggregate data from the multiple UEs and, accordingly, generate a more accurate global data model based on the parameters or gradients received from the multiple UEs. Such improvement in federated learning operations may result in increased adoption of federated learning, which may provide for shorter training timelines and greater security or privacy due to task distribution among multiple UEs and the potential to avoid the sharing of raw data among multiple devices.

Aspects of the disclosure are initially described in the context of wireless communications systems. Aspects of the disclosure are additionally described with reference to an over-the-air computation technique, a federated learning technique, and a process flow. Aspects of the disclosure are further illustrated by and described with reference to apparatus diagrams, system diagrams, and flowcharts that relate to reporting for information aggregation in federated learning.

FIG. 1 illustrates an example of a wireless communications system 100 that supports reporting for information aggregation in federated learning in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a quantity of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information (CSI) reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a UE 115 may be configured to transmit data in an uplink message (e.g., an unencoded uplink signal) to a network device (e.g., an edge server, a remote parameter server, a base station 105, etc.) in coordination with other UEs 115 on overlapping time and frequency resources according to an over-the-air computation procedure. In such systems, the transmitted data may include parameters or gradients associated with updating a local data model (e.g., an artificial intelligence or machine learning model) at the UE 115, and the network device may aggregate data from multiple UEs 115 to generate a global data model. In some cases, a quantity of UEs 115 may transmit data to the network device across a shared channel (e.g., a multiple access channel) as part of an over-the-air computation procedure, which may be equivalently referred to as an air computation procedure or an AirComp procedure.

In some implementations of the present disclosure, a UE 115 may receive a control message, such as a DCI message, from a base station 105 (e.g., a network device) scheduling a first message transmitted using an unencoded uplink signal from the UE 115 to the base station. The first message may include the parameters or gradients associated with updating the local data model at the UE 115. In some examples, the control message may schedule the first message for concurrent transmission with other unencoded uplink signals from other UEs 115 for averaging information while the unencoded uplink signals are being transmitted over the air to the base station 105. The UE 115, based on receiving the control message, may transmit the first message to the base station 105. In some aspects, the UE 115 may completely transmit the first message including all data that is scheduled for transmission from the UE 115 to the base station 105. In some other aspects, the UE 115 may partially transmit the first message including a portion of the data that is scheduled for transmission from the UE 115 to the base station 105.

Additionally, the UE 115 may transmit, using an encoded uplink signal (as opposed to an unencoded uplink signal), a second message to the base station 105 including reporting information associated with the first message. For example, the second message may indicate that the UE 115 transmits the first message to the base station 105 or may indicate that the UE 115 successfully received the control message scheduling the first message from the UE 115 to the base station 105. Other UEs 115 scheduled to transmit data including parameters or gradients associated with updating their respective local data models may perform similar procedures, such that the base station 105 may receive a second message (e.g., reporting information) from each UE 115 that transmitted data to the base station 105 over the scheduled shared channel resources or that successfully received the control message scheduling the data transmissions over the shared channel resources. As such, the base station 105 may determine a quantity of UEs 115 that transmit data using unencoded uplink signals over the scheduled shared channel resources and may use the determined quantity as a value for averaging the energy detected over the scheduled shared channel resources to determine parameters for an updated global model. In some aspects, the base station 105 may transmit an indication of the updated global model to the UEs 115.

This process of training neural networks at multiple UEs 115, transmitting parameters or gradients of the neural networks to the base station 105, and receiving an indication of an updated global model from the base station 105 may be considered a communication round. Communication rounds may continue until the base station 105 determines that the global model converges (e.g., the loss of the global model approaches a minima with a decreasing trend) and the base station 105 may refrain from broadcasting an indication of the updated model to the multiple UEs 115 based on determining that the global model has converged. Performing such a distributed learning process may improve data security and privacy, as the multiple UEs 115 may transmit neural network parameters or gradients to the base station 105 instead of raw data. Additionally, an over-the-air computation procedure for concurrent analog transmissions may harness the signal-superposition property of a shared channel, thereby improving system efficiency and increasing system capacity.

Figure 2:
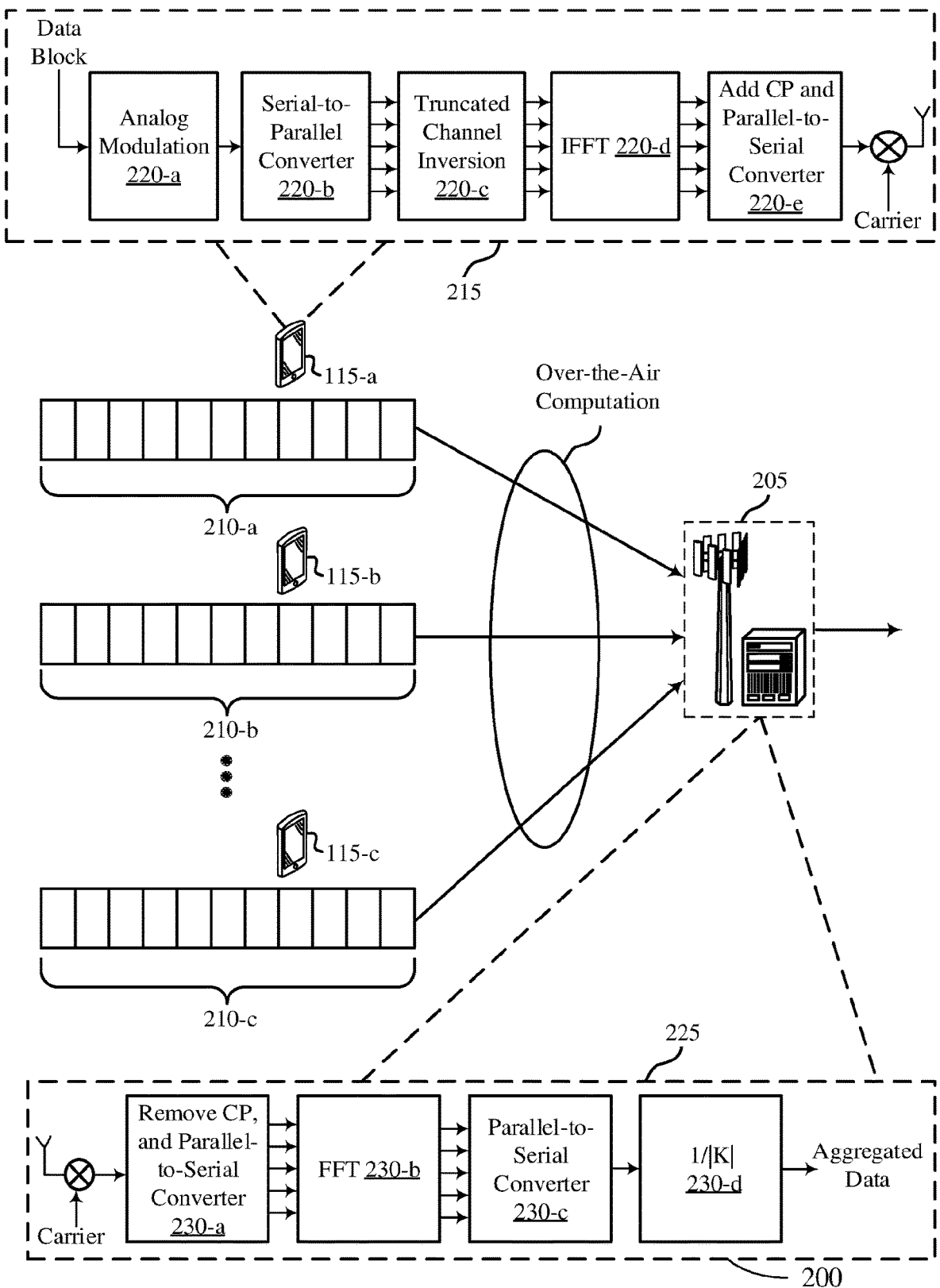
FIG. 2 illustrates an example of an over-the-air computation technique that supports reporting for information aggregation in federated learning in accordance with aspects of the present disclosure.

FIG. 2 illustrates an example of an over-the-air computation technique 200 that supports reporting for information aggregation in federated learning in accordance with aspects of the present disclosure. In some examples, the over-the-air computation technique 200 may implement aspects of the wireless communications system 100. For example, the over-the-air computation technique 200 may include a base station 205 (e.g., an edge server, a remote parameter server, a network device, etc.), which may be an example of a base station 105 as described with reference to FIG. 1. Over-the-air computation technique 200 may further include a UE 115-a, a UE 115-b, and a UE 115-c, which may be examples of UEs 115 as described with reference to FIG. 1. In some implementations, a UE 115 may be configured to provide reporting information (e.g., in a second message) to the base station 205 accompanying a transmission of an unencoded uplink signal (e.g., a first message) including data associated with updating a local data model if the UE 115 successfully receives a control message scheduling the unencoded uplink signal or if the UE 115 transmits the unencoded uplink signal.

In some wireless communications systems, multiple UEs 115 (e.g., the UE 115-a, the UE 115-b, and the UE 115-c) may transmit data to the base station 205 in accordance with the transmitter design 215. The transmitter design 215 may apply analog modulation and pre-equalization to a data block to form an unencoded uplink signal and the unencoded uplink signal may be transmitted to the base station 205 across a shared channel (e.g., a multiple access channel). Transmitting unencoded uplink signals across a shared channel may support over-the-air computation, which may reduce data transmission latency and decrease the amount of radio resources consumed for the transmission of the unencoded signals. In some examples, unencoded signals may not be encoded with error control coding, such as a polar code or an error correction code.

The UE 115-a may be associated with radio resources 210-a, the UE 115-b may be associated with radio resources 210-b, and the UE 115-c may be associated with radio resources 210-c. The radio resources 210-a, 210-b, and 210-c may partially or fully overlap (e.g., may correspond to the same time and frequency resources) and may correspond to a multiple access or shared channel. The UEs 115 may apply pre-equalization parameters (e.g., channel inversion coefficients, transmit power scaling) to the unencoded uplink signal to improve signal characteristics (e.g., the received signal power at the base station 205, the SNR, etc.), which may improve the efficiency of aggregating or averaging the data received at the base station 205.

A UE 115-a may process a data block in accordance with the transmitter design 215. The transmitter design 215 may apply analog modulation (e.g., analog amplitude modulation) to a data block at 220-a, perform serial-to-parallel conversion at 220-b, perform truncated channel inversion at 220-c, perform inversion Fast Fourier Transformation (IFFT) at 220-a, add a cyclic prefix (CP) and perform parallel-to-serial conversion at 220-e, and the resulting data may be transmitted to the network device via a carrier (e.g., a multiple access channel). In some implementations, the UEs 115 may transmit parameters or gradients of a local data model (e.g., a neural network) to the base station 205 containing a global model, however, the techniques described herein may also be applicable to other scenarios such as distributed sensor measurements, among others.

A base station 205 may process a superimposed waveform according to the receiver design 225. For example, the superimposed waveform may be associated with waveforms transmitted by each of the UEs 115 over the shared channel to the base station 205. The base station 205 may remove the CP and perform parallel-to-serial conversion at 230-a, perform Fast Fourier Transformation (FFT) at 230-b, perform parallel-to-serial conversion at 230-c, and may average the aggregate parameters or gradients (e.g., divide the aggregate parameters or gradients by a quantity of UEs 115 (e.g., a quantity K)) at 230-d. As such, the base station 205 may receive one or more aggregate values (e.g., aggregate parameters, aggregate edge weights, aggregate gradients, etc.) corresponding to the aggregation of values from the UEs 115 and may average the aggregate values by diving the aggregate values by the quantity of UEs 115 transmitting data (e.g., parameters or gradients) on the shared channel. The base station 205 may update parameters or gradients of a global data model based on the aggregate or average values indicating updates to local models at the UEs 115, and may transmit (e.g., broadcast) the updated parameters or gradients to the UEs 115.

A base station 205 may configure a UE 115 to identify or determine one or more parameters related to the processing or transmission of the unencoded uplink signal (e.g., a plurality of channel inversion coefficients). For example, the base station 205 may transmit a control message (e.g., an RRC message, a MAC-CE, a DCI, etc.) to the UE 115, and the control message may configure the UE 115 to determine the plurality of channel inversion coefficients. In some cases, the UE 115 may determine the plurality of channel inversion coefficients based on a reference signal (e.g., a CSI-RS, an SSB-index, etc.). In some examples, the UE 115-a may identify the refence signal based on a transmission configuration indicator (TCI)-state indication of an uplink grant scheduling the unencoded uplink signal (e.g., a physical uplink shared channel (PUSCH) transmitting the over-the-air computation signal). In some examples, the unencoded uplink signal may be based on a configured grant (CG)-PUSCH and the UE 115 may identify the reference signal based on an RRC message or other control signaling.

The UEs 115 may identify resources to use to send the unencoded uplink signal based on specific control singling. For example, the UEs 115 may identify a quantity of resources of a PUSCH via a specific DCI or a field of a DCI received from the base station 205. The UEs 115 may receive an identifier message such as a radio network temporary identifier (RNTI) that the UEs 115 may use to decode the specific DCI message containing the resource allocation for transmission of the unencoded message. In some cases, the RNTI may be a dedicated RNTI that is different from other RNTIs received by the UEs 115 (e.g., the RNTI may be configured to specifically notify the UEs of the DCI that schedules the PUSCH for transmitting the unencode message). The UEs 115 may identify allocated resources (e.g., a specific PUSCH or a CG PUSCH) for the transmission of the model parameters in the unencoded uplink message. In addition, the DCI may include various other parameters associated with local model aggregation for over-the-air computation such that the UEs 115 may transmit the model parameters on overlapping resources of the PUSCH to the base station 205.

In some cases, however, one or more of the UEs 115 (e.g., one or more of the UE 115-*a*, the UE 115-*b*, and the UE 115-*c*) may unsuccessfully receive the control signaling allocating resources for or otherwise scheduling the transmissions of the unencoded uplink signals over the multiple access or shared channel. For example, the base station 205 may transmit a DCI message to each of the UE 115-*a*, the UE 115-*b*, and the UE 115-*c* to schedule transmissions (e.g., concurrent transmissions) of unencoded uplink signals from each of the UE 115-*a*, the UE 115-*b*, and the UE 115-*c* and, based on transmitting the DCI message to each of the UEs 115, the network device may determine that the quantity K of UEs 115 that transmit unencoded uplink signals includes at least the UE 115-*a*, the UE 115-*b*, and the UE 115-*c*.

In some examples, however, the UE 115-*a* may fail to successfully receive the DCI message and, likewise, may refrain from transmitting an unencoded uplink signal to the base station 205 over the resources scheduled by the DCI message or otherwise configured by the base station 205. The base station 205 may be unaware that the UE 115-*a* failed to receive the DCI message and does not transmit an unencoded uplink signal, and may accordingly average the determined aggregate values (e.g., the aggregate parameters, the aggregate edge weights, the aggregate gradients, etc.) based on a quantity K including the UE 115-*a*, which may be inaccurate (e.g., too large) because the UE 115-*a* does not actually transmit an unencoded uplink signal.

In some other examples, the UE 115-*a* may successfully receive the DCI message from the base station 205, but may refrain from completely transmitting the scheduled unencoded uplink signal to the base station 205. For example, the unencoded uplink signal scheduled for transmission from the UE 115-*a* to the base station 205 may include a quantity of coefficients associated with information in the encoded uplink signal (e.g., information relating to parameters, edge weights, gradients, etc. associated with a federated learning operation) and the UE 115-*a* may determine to refrain from transmitting one or more of the quantity of coefficients.

In some implementations, the UE 115-*a* may refrain from transmitting the one or more coefficients based on truncating the one or more coefficients from the unencoded uplink signal based on a power limitation of the UE 115-*a* or other implementation issues at the UE 115-*a*. For example, at 220-*c*, the UE 115-*a* may truncate the one or more coefficients as part of the channel inversion operation. In some other examples, the UE 115-*a* may refrain from transmitting the one or more coefficients based on observing or otherwise determining that a fading gain is lower than a threshold level (e.g., based on determining that an observed fading gain is too low). For example, the UE 115-*a* may determine to stop transmitting based on determining that a CSI fading gain is below a threshold level. In such examples, however, the base station 205 may be unaware that the UE 115-*a* truncated a portion of its scheduled unencoded uplink signal and may accordingly average each (e.g., all) of the determined aggregate values based on a quantity K including the UE 115-*a*, which may be inaccurate because the UE 115-*a* may not contribute to some of the aggregate values. For example, the UE 115-*a* may not transmit information associated with one or more of the parameters, edge weights, gradients, etc. that were scheduled for transmission as part of the federated learning operation.

In such examples in which the UE 115-*a* unsuccessfully receives the DCI message scheduling the unencoded uplink message (and therefore may not transmit any of the unencoded uplink message) or transmits a portion of the unencoded uplink signal, the base station 205 may assume an inaccurate quantity K and, as such, may determine inaccurate average aggregate values and update the global model based on the inaccurate average aggregate values. Such inaccuracy may result in an erroneous or contaminated aggregate model, which may result in poor performance of an associated machine learning algorithm or involved application.

In some implementations of the present disclosure, each of the UEs 115 may provide reporting information to accompany an unencoded uplink signal. Such reporting information may indicate that a UE 115 successfully received the scheduling DCI message, may indicate that the UE 115 transmits the unencoded uplink signal, or may indicate one or more coefficient indexes corresponding to one or more coefficients that the UE 115 did not transmit in the unencoded uplink message (a partial unencoded uplink message), or any combination thereof, and the base station 205 may use such information to determine a more accurate averaging coefficient. The UE 115 may transmit such reporting information to the base station 205 within a message, which may be referred to herein as a second message, according to various waveforms and over various channel types. Additional details relating to the waveform and resource allocation over which a UE 115 may transmit such reporting information are described herein, including with reference to FIG. 3.

Figure 3:
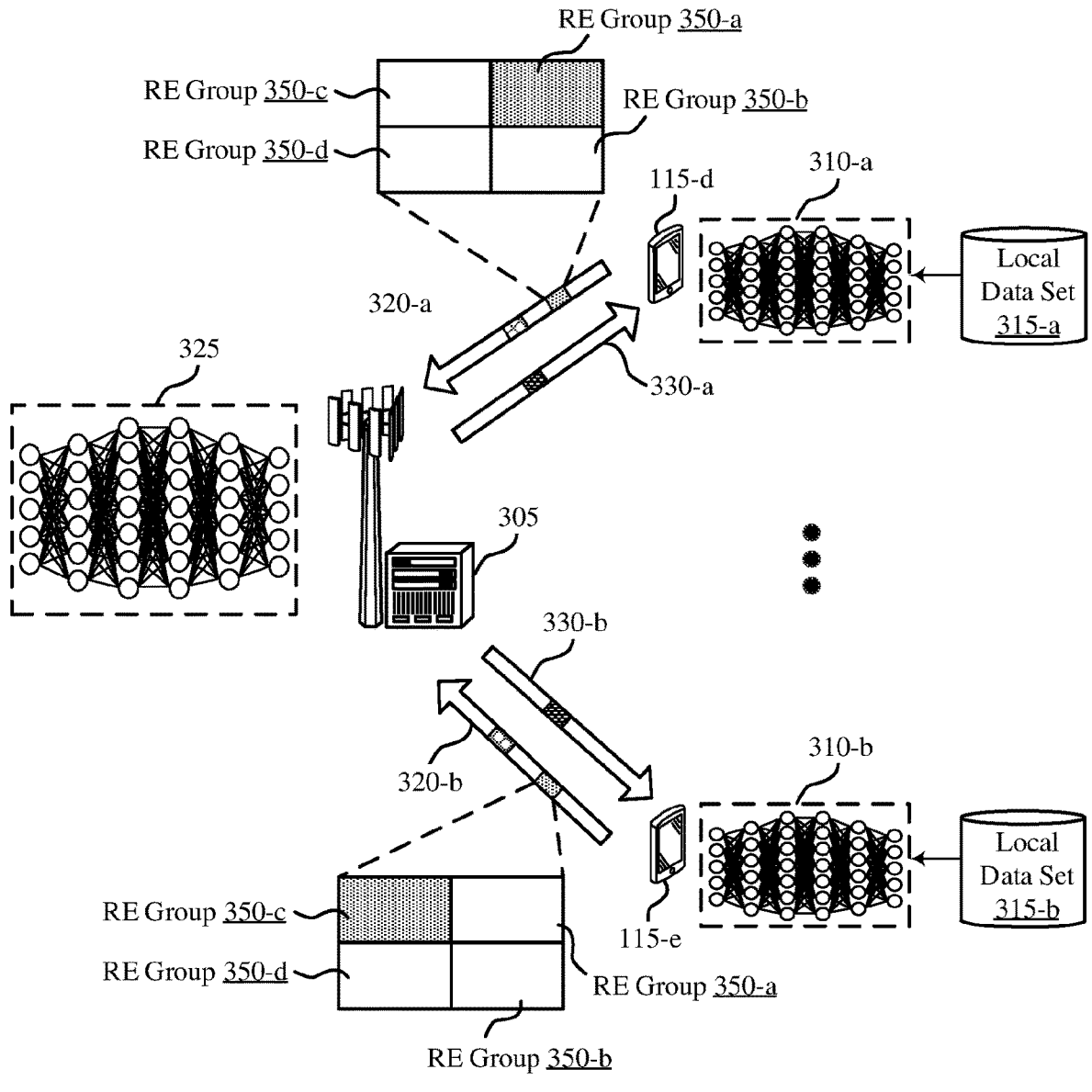
FIG. 3 illustrates an example of a federated learning technique that supports reporting for information aggregation in federated learning in accordance with aspects of the present disclosure.

FIG. 3 illustrates an example of a federated learning technique 300 that supports reporting for information aggregation in federated learning in accordance with aspects of the present disclosure. In some examples, the federated learning technique 300 may implement aspects of the wireless communications system 100. The federated learning technique 300 may include a UE 115-*d*, a UE 115-*e*, and a base station 305, which may be examples of UEs 115 and a base station 105 as described with reference to FIG. 1. In some implementations, the base station 305 may schedule the UE 115-*d* and the UE 115-*e* for concurrent transmission of a first message 340 (where a first message 340 may be examples of an unencoded uplink signal) via a DCI message 335 (which may be broadcast or transmitted to each of the UE 115-*d* and the UE 115-*e* separately), and the UE 115-*d* and the UE 115-*e* may each transmit a second message 345 to the base station 305 to provide some reporting information associated with their respective transmissions of the first message 340.

The federated learning technique 300 may support updating a global data model 325 based on a plurality of local data models 310. In some cases, a data model may correspond to a neural network, and a global data model may correspond to a general data model. UE 115-*d* may generate local data model 310-*a* based on local data set 315-*a* and transmit a set of parameters or gradients corresponding to local data model 310-*a* across a multiple access channel 320-*a* to the base station 305. UE 115-*e* may generate local data model 310-*b* based on local data set 315-*b* and transmit a set of parameters or gradients corresponding to local data model 310-*b* across the multiple access channel 320-*b* to the base station 305. UE 115-*d* and UE 115-*e* may modulate the sets of parameters or gradients into a sequence of symbols, divide the sequence of symbols into data blocks, and transmit each data block across the multiple access channel 320 in an OFDM symbol, where one parameter or gradient is transmitted across a subchannel of the multiple access channel 320 during the OFDM symbol. A federated learning technique may be an example of a machine learning technique that trains an algorithm across multiple decentralized edge devices holding local data samples, without exchanging the data samples. This approach stands in contrast to traditional centralized machine learning techniques where all the local datasets are uploaded to one computing device. In some cases, federated learning may enable multiple actors to build a common, robust machine learning model without sharing data, thus allowing the machine learning model to use data that would otherwise be protected or restricted based on data privacy, data security, and data access rights.

The base station 305 may receive a set of aggregate parameters or aggregate gradients corresponding to the parameters or gradients of the local models 310. The base station 305 may calculate a set of average parameters or average gradients, update the global model with the set of average parameters or average gradients, and broadcast the updated parameters or gradients of the global model 325 to the UEs 115 via a channel 330-a and a channel 330-b. In some cases, the UEs 115 may train the local models 310 and determine the local parameters or gradients based on receiving a training indication from the base station 305.

In some cases, over-the-air computation techniques used to aggregate parameters or gradients of local models may be performed such that the UEs 115 transmit the parameters or gradients using overlapping radio resources, which may reduce the amount of consumed radio resources used for model aggregation. In such cases the base station 305 may identify set of resources that the UEs 115 may use for transmitting such model parameters or gradients. For example, the base station 305 may identify a quantity of resources of a PUSCH corresponding to a PHY-MAC interface to support the over-the-air computation.

To notify the UEs 115 of the allocated resources for sending the model parameters or model gradients (which may be included in the first message 340), the base station 305 may transmit, to each of the UEs 115, DCI message 335 including an indication of the resource allocation. In some cases, the base station 305 may additionally transmit an RNTI to each of the UEs 115 that the UEs 115 may use to decode the DCI message 335. The DCI message 335 may be an uplink-grant DCI that is specific to allocating resources for transmitting the first message 340. In some aspects, the UEs 115 may determine, based on the DCI message 335, that a specific PUSCH or a configured grant (CG) PUSCH is allocated for the transmission of the first message 340. Additionally, the DCI message 335 may include various other parameters associated with model aggregation such that the UEs 115 may transmit the model parameters on overlapping resources of the PUSCH.

In some cases, the DCI message 335 may indicate resources of a CG-PUSCH for transmission, and the UEs 115 may store the CG-PUSCH for use according to a pre-configured timing indicated by the configured grant. For example, the DCI message 335 may activate or deactivate the CG-PUSCH for use to transmit the first message 340 (including the model parameters and the model gradients). For example, UEs 115 may receive an RNTI for decoding the DCI message 335, which indicates that CG-PUSCH is activated. In such cases, the UEs 115 may use configured resources of the CG-PUSCH to transmit the first message 340 based on the activation indicated in the DCI message 335. In some other examples, the DCI message 335 may indicate that the CG-PUSCH is deactivated, and the UEs 115 may refrain from using the configured resources of the CG-PUSCH for transmission of the first message 340.

In some examples, the UE 115-d and the UE 115-e may each receive the DCI message 335 from the base station 305 and, accordingly, may each determine to transmit a first message 340 over the identified resource allocation. In some implementations of the present disclosure the UE 115-d and the UE 115-e, based on successfully receiving the DCI message 335 and transmitting the first message 340, may transmit a second message 345 to the base station 305 providing reporting information associated with the first message 340. In some examples, the second message 345 may include an ACK associated with or corresponding to the DCI message 335 scheduling the first message 340 and the base station 305, based on receiving the second message 345, may determine that the DCI message 335 was successfully received at the UE 115 from which the second message 345 was transmitted. In some other examples, the second message 345 may include an ACK associated with or corresponding to the transmission of the first message 340 and the base station 305, based on receiving the second message 345, may determine that the DCI message 335 was successfully received at the UE 115 from which the second message 345 was transmitted as well as determine that the UE 115 transmits the first message 340.

In such examples in which the second message 345 includes or otherwise indicates an ACK, a UE 115 may transmit the second message 345 to the base station 305 over a resource allocation with an energy or sequence modulation associated with the UE 115. For example, the base station 305 may allocate a resource element group 350 to each of the UE 115-d and the UE 115-e over which the UE 115-d and the UE 115-e may transmit a second message 345 and, in some examples, the UE 115-d and the UE 115-e may use a waveform based on UE-specific resource element group energy modulations. As shown in FIG. 3, the base station 305 may configure four resource element groups 350, including a resource element group 350-a, a resource element group 350-b, a resource element group 350-c, and a resource element group 350-d, and may allocate the resource element group 350-a to the UE 115-d and may allocate the resource element group 350-c to the UE 115-e. Accordingly, the UE 115-d may transmit the second message 345 over the resource element group 350-a and the UE 115-e may transmit the second message 345 over the resource element group 350-c. In some examples, such allocation of resource element groups 350 to different UEs 115 for the transmission of the second message 345 may be pre-configured (e.g., as part of a CG-PUSCH) or may be indicated by the DCI message 335. In some examples, the DCI message 335 may indicate a physical channel resource (e.g., a physical uplink control channel (PUCCH) resource) over which the UE 115-d or the UE 115-e may transmit the second message 345.

As such, the base station 305 may monitor each of the resource element groups 350 to detect the reception of a second message 345 from a quantity of different UEs 115. In examples in which the base station 305 receives a second message 345 over a resource element group 350 (e.g., detects energy over the resource element group 350), the base station 305 may determine that the corresponding UE 115 transmits a first message 340 and may determine a value for averaging the aggregate values of multiple first messages 340 based on determining that the corresponding UE 115 transmits the first message 340 (e.g., the base station 305 may include the corresponding UE 115 in a quantity K of UEs 115 that transmit first messages 340). Alternatively, in examples in which the base station 305 does not receive a second message 345 over a resource element group 350 (e.g., does not detect energy over the resource element group 350), the base station 305 may determine that a corresponding UE 115 does not transmit a first message 340 and may determine a value for averaging the aggregate values of the multiple first messages 340 based on determining that the corresponding UE 115 does not transmit the first message 340 (e.g., the base station 305 may not include the corresponding UE 115 in a quantity K of UEs 115 that transmit first messages 340).

In some other implementations of the present disclosure, a UE 115 may transmit an indication of one or more coefficient indexes in the second message 345 corresponding to one or more coefficients associated with information in the first message 340 that the UE 115 did not transmit. For example, the UE 115 may transmit a portion (but not all) of the first message 340 and may indicate what portion of the first message 340 the UE 115 did not transmit in the second message 345. In some examples, a coefficient of the first message 340 may be associated with an over-the-air computation transmission instance (e.g., an instance of a transmission of the first message 340), and each of the UEs 115 transmitting concurrent first messages 340 for over-the-air computation may be synchronous with respect to the information is transmitted at a given time (e.g., in what order information of the first message 340 is transmitted). As such, the UE 115 may indicate, via the second message 345, the one or more coefficient indexes that the UE 115 did not transmit in the first message 340 and the base station 305 may calculate or otherwise determine the value for averaging the aggregate values of the multiple first messages 340 based on the indication of what coefficient indexes the UE 115 did not transmit. For example, the base station 305 may determine an averaging value associated with each transmission instance of the first message 340 based on determining the quantity K of UEs 115 that transmitted a coefficient associated with the transmission instance.

In implementations in which the UE 115-*d* or the UE 115-*e* report the coefficient indexes associated with the first message 340 that were not transmitted by including an indication of the coefficient indexes in the second message 345, the UE 115-*d* or the UE 115-*d* may transmit the second message 345 via a single transmission over a physical channel, such as a PUCCH or a PUSCH, or may transmit the second message 345 via multi-part or variable length uplink control information. In examples in which a UE 115 transmits the second message 345 via a single transmission over a physical channel, the UE 115 may identify the resource allocation based on the DCI message 335, based on a configuration (e.g., a pre-configuration), or based on requesting an uplink grant over which to transmit the second message 345. In some examples, for instance, the DCI message 335 may include an indication of a PUCCH resource over which the UE 115 may transmit the second message 345. In some other examples, the UE 115 may identify or otherwise determine a PUCCH resource that is configured or pre-configured for providing reporting information associated with the first message 340.

In some other examples, the UE 115 may transmit the second message 345 as uplink control information that is multiplexed over a PUSCH resource, and the UE 115 may determine the PUSCH resource based on transmitting a scheduling request or a MAC-CE to the base station 305 requesting a resource for transmitting the second message 345, based on determining a resource indicated by the DCI message 335, or based on determining a configured or pre-configured resource. Alternatively, the UE 115 may transmit the second message 345 to the base station 305 via higher layer signaling, such as via a MAC-CE.

In examples in which a UE 115 transmits the second message 345 via multi-part or variable length uplink control information, the UE 115 may reduce a payload size associated with the uplink control information by partitioning the information provided by the second message 345 into two or more separate transmissions. For example, the UE 115 may transmit a first part of the second message 345 over a first set of resources and may transmit a second part of the second message 345 over a second set of resources. In some examples, the first part of the second message 345 (and likewise the first set of resources) may be associated with a fixed payload size and the second part of the second message 345 (and likewise the second set of resources) may be associated with a variable payload size. For instance, the first part of the second message 345 may indicate a value corresponding to quantity of coefficient indexes that the UE 115 does not transmit in the first message 340 (where such a value may be indicated by a fixed quantity of bits) and the second part of the second message 345 may include the indication of the quantity of coefficient indexes (where such an indication may be variable depending on how many coefficient indexes are not transmitted by the UE 115). In some aspects, the first part and the second part of the second message 345 may be scheduled or transmitted over separate PUSCH or PUCCH resources.

In some implementations, the UE 115 may request resources for transmitting the second message 345 (e.g., via a scheduling request or a MAC-CE) and, in response to the request, the base station 305 may schedule a PUCCH or a PUSCH, or a combination thereof, including the first set of resources and the second set of resources over which the UE 115 may transmit both the first part and the second part of the second message 345, respectively. In such implementations, the UE 115 may employ some transmission dropping according to priority rules of the coefficients. For example, if the allocated resources are insufficient to include an indication of all of the coefficient indexes that are not transmitted, the UE 115 may prioritize some coefficients over other coefficients and refrain from transmitting the lower priority coefficients. For instance, the UE 115 may prioritize odd coefficient indexes over even coefficient indexes, or even coefficient indexes over odd coefficient indexes, or higher coefficient indexes over lower coefficient indexes, or lower coefficient indexes over higher coefficient indexes, or prioritize some coefficients over other coefficient indexes in any other way.

In some other implementations, the UE 115 may request resources for transmitting the second message 345 (e.g., via a scheduling request or a MAC-CE) and, in response to the request, the base station 305 may schedule a PUCCH or a PUSCH including the first set of resources over which the UE 115 may transmit the first part of the second message 345. In such implementations, the UE 115 may transmit the first part of the second message, which may indicate the value corresponding to the quantity of coefficient indexes to be included in the second part of the second message 345, and the base station 305 may schedule or allocate a PUSCH or a PUCCH including the second set of resources based on receiving the first part of the second message 345. For example, the base station 305 may use the first part of the second message 345 to determine a size of the second part of the second message 345 and may allocate the second set of resources to the UE 115 for transmitting the second part of the second message 345 based on the determined size. As such, the UE 115 may transmit second part of the second message 345 to the base station 305 over the second set of resources.

Accordingly, the base station 305 may receive a second message 345 from a quantity of UEs 115 and determine a value for averaging the aggregate values associated with received first messages 340 based on the quantity of UEs 115 from which a second message 345 was received. Such practice may enable the base station 305 to determine a more accurate value for averaging the aggregate values which may, in turn, enable the base station 305 to more accurately update a global data model and perform a more seamless federated learning operation.

Figure 4:
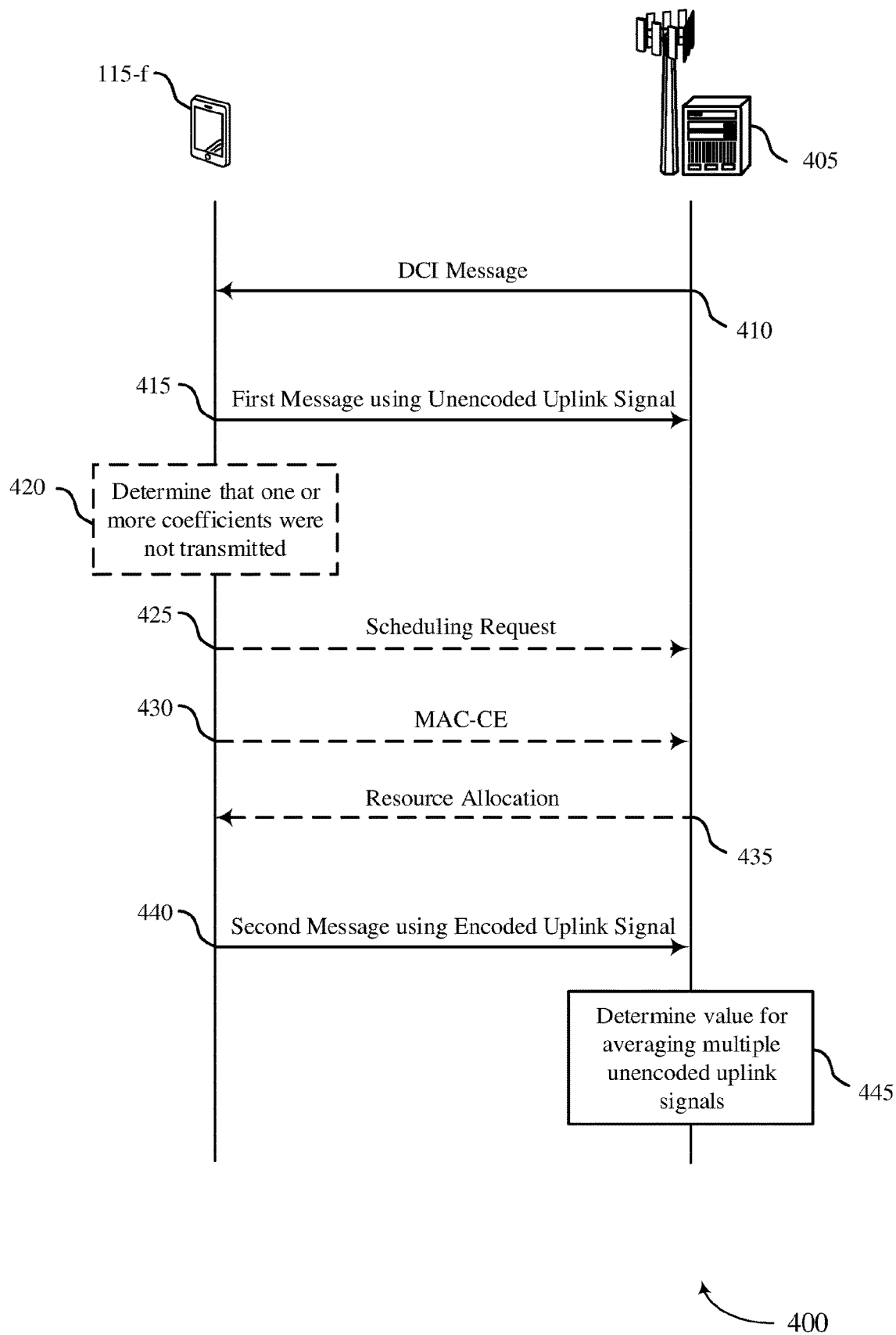
FIG. 4 illustrates an example of a process flow that supports reporting for information aggregation in federated learning in accordance with aspects of the present disclosure.

FIG. 4 illustrates an example of a process flow 400 that supports reporting for information aggregation in federated learning in accordance with aspects of the present disclosure. In some examples, the process flow 400 may implement aspects of the wireless communications system 100 and the wireless communications system 200. For example, the process flow 400 may illustrate communications between a base station 405 and a UE 115-*f*, which may be examples of corresponding devices described herein, such as UEs 115 and base stations as described with reference to FIGS. 1-3. In some implementations, the UE 115-*f* may provide reporting information accompanying a transmission of an unencoded uplink signal as part of a federated learning operation. Alternative examples of the process flow may be implemented, in which some features are performed in a different order than described or are not performed at all. In some examples, operations may include additional features not mentioned herein, or further operations may be added.

At 410, the base station 405 may transmit, to the UE 115-*f*, a DCI message scheduling a first message transmitted using an unencoded uplink signal from the UE 115-*f* to the base station 405. In some examples, the scheduled unencoded uplink signal is associated with a concurrent transmission with other unencoded uplink signals for averaging information while the unencoded uplink signal is transmitted. For example, the first message transmitted using the unencoded uplink signal may include data relating to model parameters or gradients associated with updating a local model at the UE 115-*f* and, as such, the transmission of the first message to the base station 405 may be part of a federated learning operation. Further, in some aspects, the unencoded uplink signal may be an over-the-air computation signal.

In some examples of the present disclosure, the UE 115-*f* may unsuccessfully receive the DCI message from the base station 405 and, as such, may refrain from transmitting the first message using the unencoded uplink signal and from transmitting the second message using the encoded uplink signal that provides reporting information associated with the first message. In such examples, the base station 405 may monitor for the second message over a resource allocation and, based on not receiving the second message over the resource allocation, may determine that the UE 115-*f* does not transmit the first message using the unencoded uplink signal. The base station 405 may determine a value for averaging multiple concurrent unencoded uplink signals based on determining that the UE 115-*f* does not transmit the first message, which may result in a more accurate averaging and may potentially result in faster learning of an associated machine learning algorithm. In such examples in which the UE 115-*f* fails to receive the DCI message at 405, the UE 115-*f* and the base station 405 may refrain from performing the operations shown by 415 through 445.

At 415, the UE 115-*f* may transmit, using the unencoded uplink signal, the first message to the base station 405 based on receiving the DCI message. For example, the DCI message may schedule and, in some examples, indicate resources over which the UE 115-*f* may transmit the first message. In some aspects, the unencoded uplink signal may be an over-the-air computation signal as part of a federated learning operation and, as such, the UE 115-*f* may provide updated parameters or updated gradients based on a local model to the base station 405 via the first message.

At 420, the UE 115-*f* may, in some implementations, determine that one or more coefficients associated with information included in the first message were not (or will not be) transmitted to the base station 405. For example, the UE 115-*f* may truncate one or more coefficients from the first message based on a power limitation of the UE or based on determining that a fading gain (e.g., a CSI fading gain) is below a threshold level.

At 425 or 430, the UE 115-*f* may request a resource allocation for transmitting a second message including reporting information associated with the first message. For example, at 425, the UE 115-*f* may transmit a scheduling request to the base station 405 requesting a resource allocation over which the UE 115-*f* may transmit the second message. Alternatively, at 430, the UE 115-*f* may transmit a MAC-CE to the base station 405 requesting a resource allocation over which the UE 115-*f* may transmit the second message. Alternatively, the UE 115-*f* may determine a resource allocation over which the UE 115-*f* may transmit the second message based on an indication in the DCI message or based on a configured (e.g., a pre-configured) uplink grant, such as a CG-PUSCH. In such examples, the UE 115-*f* may refrain from transmitting the scheduling request at 425 and refrain from transmitting the MAC-CE at 430.

At 435, the base station 405 may transmit an indication of a resource allocation over which the UE 115-*f* may transmit the second message. The base station 405 may transmit the indication of the resource allocation in response to a scheduling request or a MAC-CE. In some examples, the resource allocation may be a single set of resources over which the UE 115-*f* may transmit the second message. In some other examples, the resource allocation may include multiple sets of resources (e.g., two sets of resources) for a multi-part transmission of the second message. In such examples, the base station 405 may transmit an indication of a first set of resources over which the UE 115-*f* may transmit a first part of the second message and may transmit an indication of a second set of resources over which the UE 115-*f* may transmit a second part of the second message. In some implementations, the base station 405 transmit the indication of the second set of resources after receiving the first part of the second message, which may indicate a size of the second part of the second message.

At 440, the UE 115-*f* may transmit, using an encoded uplink signal, the second message to the base station 405. In some examples, the second message may be associated with the first message (e.g., may include reporting information associated with the transmission of the first message) and may indicate that the DCI message was received. The second message may include an ACK associated with either the reception of the DCI message or the transmission of the first message or may include an indication of one or more coefficient indexes that were not (or will not be) transmitted in the first message. Further, although shown and described as being transmitted after the first message, the second message may be transmitted prior to the first message without exceeding the scope of the present disclosure. In some cases, the first message may be transmitted after the second message is transmitted. In such cases, similar procedures may be used for determining what information to include in the second message, except that the timing of transmission may be different.

At 445, the base station 405 may determine a value for averaging multiple unencoded uplink signals based on monitoring for the second message. For example, if the base station 405 receives the second message from the UE **115-*f*, the base station 405 may determine that the UE 115-*f* transmits the first message and may include the UE 115-*f* within a quantity K of UEs 115 that transmit unencoded uplink signals over a scheduled shared channel resource. Alternatively, if the base station 405 does not receive the second message from the UE 115-*f*, the base station 405 may determine that the UE 115-*f* does not transmit the first message and may not include the UE 115-*f* within a quantity K of UEs 115 that transmit unencoded uplink signals over the scheduled shared channel resource. The base station 405 may use the quantity K to average aggregate values derived from the reception of the multiple unencoded uplink signals over the shared channel resource, as described in more detail herein, including with reference to FIGS. 2 and 3**.

Figure 5:
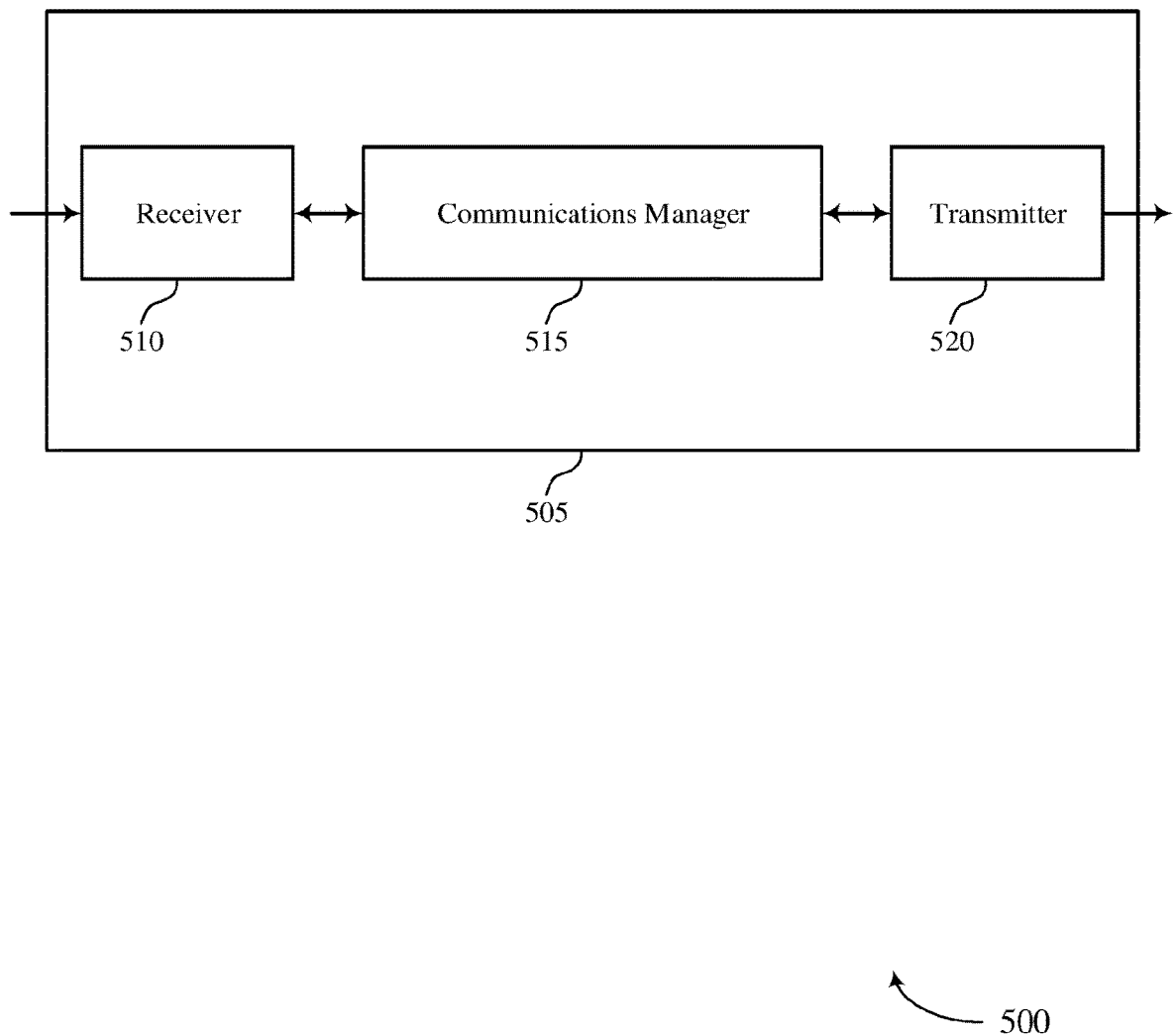
FIGS. 5 and 6 show block diagrams of devices that support reporting for information aggregation in federated learning in accordance with aspects of the present disclosure.

FIG. 5 shows a block diagram 500 of a device 505 that supports reporting for information aggregation in federated learning in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to reporting for information aggregation in federated learning, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a base station, a downlink control information message scheduling a first message transmitted using an unencoded uplink signal from the UE to the base station, where the unencoded uplink signal is associated with a concurrent transmission with other unencoded uplink signals for averaging information while the unencoded uplink signal is transmitted, transmit, using the unencoded uplink signal, the first message to the base station based on receiving the downlink control information message, and transmit, using an encoded uplink signal, a second message to the base station associated with the first message, the second message indicating that the downlink control information message was received. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and the transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. In some implementations, the communications manager 515 may provide reporting information to a base station, such as a network device or an edge server, accompanying an unencoded uplink signal that carries data relating to one or more model parameters or model gradients associated with updating a local model at the device 505. As such, the base station may more accurately update a global model and broadcast more accurate parameters or gradients back to the device 505, which may enable the device 505 and the base station to more optimally perform a federated learning operation. Such a federated learning operation may be associated with low-latency access to real-time data, reduce traffic intensity (by using over-the-air computation signals), and provide for increased privacy and security (e.g., the device 505 may participate in the federated learning operation without sharing raw data).

Figure 6:
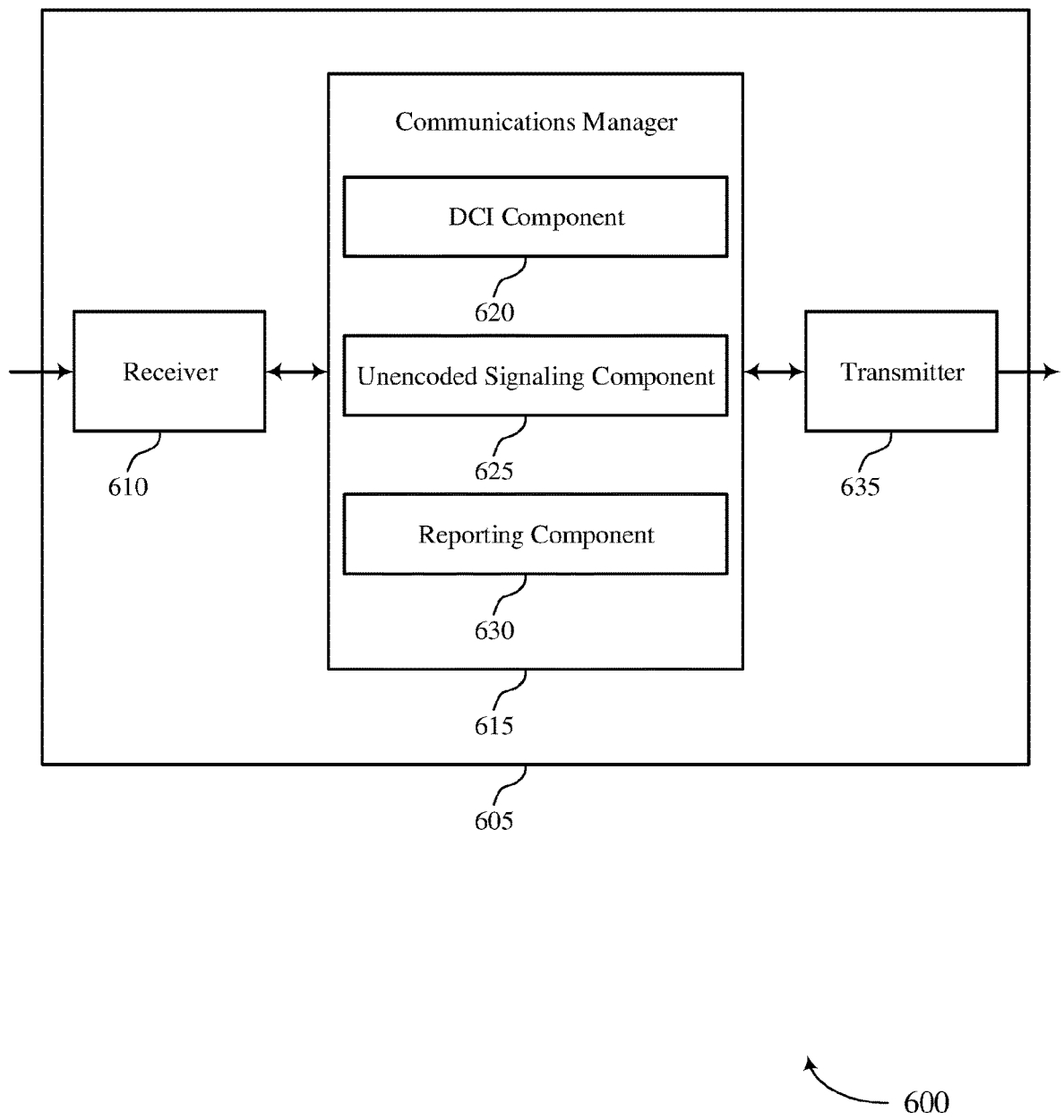

FIG. 6 shows a block diagram 600 of a device 605 that supports reporting for information aggregation in federated learning in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to reporting for information aggregation in federated learning, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a DCI component 620, an unencoded signaling component 625, and a reporting component 630. The communications manager 615 may be an example of aspects of the communications manager 810 described herein.

The DCI component 620 may receive, from a base station, a downlink control information message scheduling a first message transmitted using an unencoded uplink signal from the UE to the base station, where the unencoded uplink signal is associated with a concurrent transmission with other unencoded uplink signals for averaging information while the unencoded uplink signal is transmitted.

The unencoded signaling component 625 may transmit, using the unencoded uplink signal, the first message to the base station based on receiving the downlink control information message. The reporting component 630 may transmit, using an encoded uplink signal, a second message to the base station associated with the first message, the second message indicating that the downlink control information message was received. The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
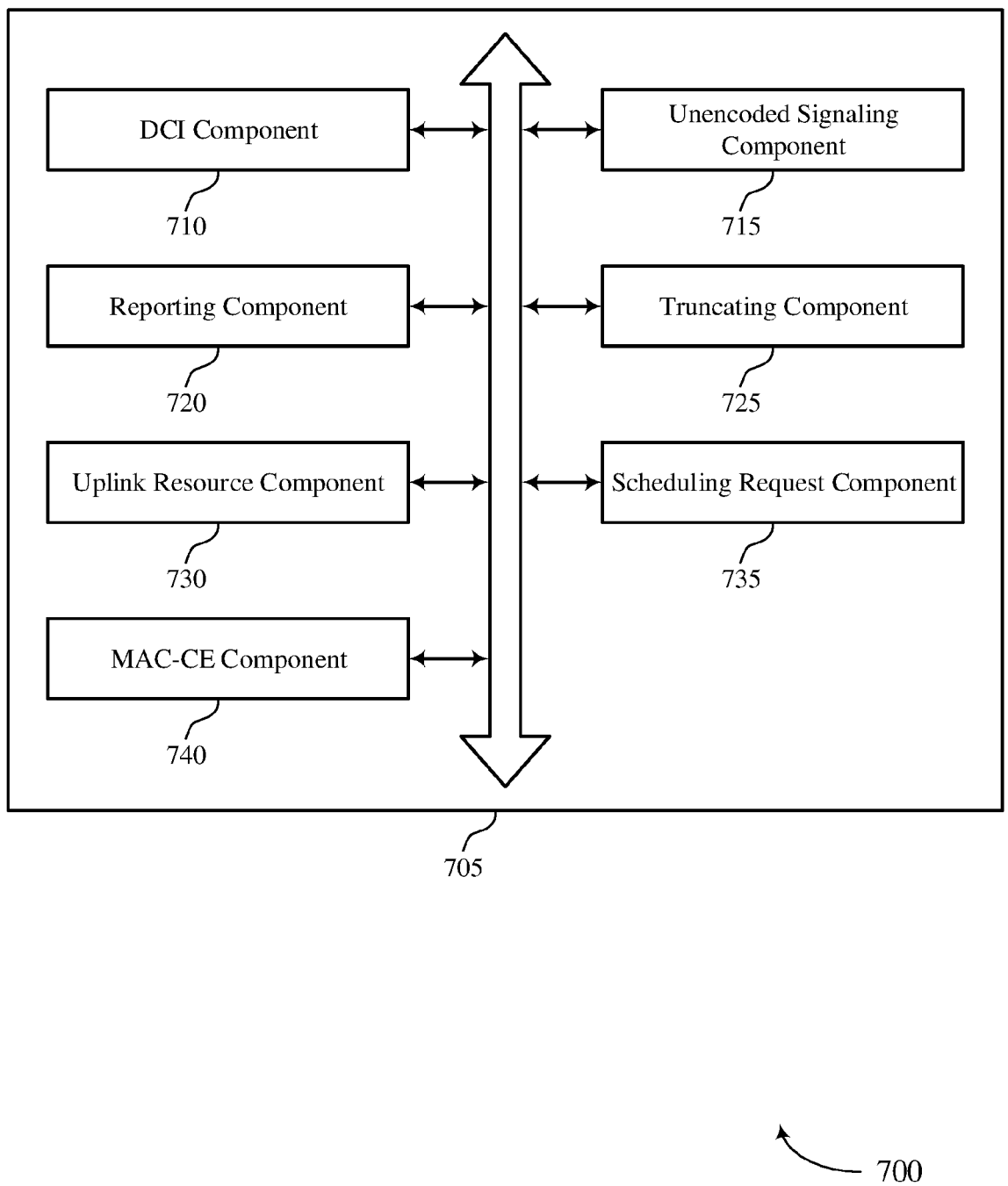
FIG. 7 shows a block diagram of a communications manager that supports reporting for information aggregation in federated learning in accordance with aspects of the present disclosure.

FIG. 7 shows a block diagram 700 of a communications manager 705 that supports reporting for information aggregation in federated learning in accordance with aspects of the present disclosure. The communications manager 705 may be an example of aspects of a communications manager 515, a communications manager 615, or a communications manager 810 described herein. The communications manager 705 may include a DCI component 710, an unencoded signaling component 715, a reporting component 720, a truncating component 725, an uplink resource component 730, a scheduling request component 735, and a MAC-CE component 740. Each of these modules may communicate, directly or indirectly, with one another (e.g., via one or more buses).

The DCI component 710 may receive, from a base station, a downlink control information message scheduling a first message transmitted using an unencoded uplink signal from the UE to the base station, where the unencoded uplink signal is associated with a concurrent transmission with other unencoded uplink signals for averaging information while the unencoded uplink signal is transmitted.

The unencoded signaling component 715 may transmit, using the unencoded uplink signal, the first message to the base station based on receiving the downlink control information message. In some cases, the unencoded uplink signal includes an over-the-air computation signal. In some cases, the unencoded uplink signal is transmitted without applying an error correcting code.

The reporting component 720 may transmit, using an encoded uplink signal, a second message to the base station associated with the first message, the second message indicating that the downlink control information message was received. In some examples, the reporting component 720 may transmit an acknowledgement associated with the first message, the acknowledgement indicating that the first message was transmitted.

In some examples, the reporting component 720 may transmit an acknowledgement associated with the downlink control information message, the acknowledgement indicating that the downlink control information message was received. In some examples, the reporting component 720 may transmit one or more coefficient indexes associated with information included in the first message. In some examples, the reporting component 720 may transmit a first part of the second message over a first set of resources.

In some examples, the reporting component 720 may transmit a second part of the second message over a second set of resources. In some cases, the first part of the second message includes an indication of a quantity of one or more coefficients associated with information of the first message and the second part of the second message includes one or more coefficient indexes corresponding to the one or more coefficients.

The truncating component 725 may determine that one or more coefficients associated with information included in the first message were not transmitted to the base station, where the second message includes an indication of one or more coefficient indexes corresponding to the one or more coefficients that were not transmitted to the base station. In some examples, the truncating component 725 may truncate the one or more coefficients from the first message based on a power limitation of the UE, where determining that the one or more coefficients were not transmitted to the base station is based on truncating the one or more coefficients from the first message.

The uplink resource component 730 may determine a resource allocation for transmitting the second message based on receiving the downlink control information message, where transmitting the second message to the base station is based on determining the resource allocation. In some examples, the uplink resource component 730 may receive, from the base station, an indication of the resource allocation for transmitting the second message based on transmitting the scheduling request, where determining the resource allocation is based on receiving the indication of the resource allocation.

In some examples, the uplink resource component 730 may receive, from the base station, an indication of the resource allocation for transmitting the second message based on transmitting the MAC control element, where determining the resource allocation is based on receiving the indication of the resource allocation. In some examples, the uplink resource component 730 may determine the resource allocation based on the downlink control information message. In some examples, the uplink resource component 730 may determine an uplink resource based on a configuration.

In some examples, the uplink resource component 730 may receive an indication of the second set of resources based on transmitting the first part of the second message over the first set of resources, where the first part of the second message indicates a size of the second part of the second message. In some cases, the resource allocation includes a resource element group corresponding to the UE. In some cases, the resource allocation includes a resource of a physical uplink control channel or a resource of a physical uplink shared channel, or a combination thereof.

The scheduling request component 735 may transmit, to the base station, a scheduling request associated with the second message. The MAC-CE component 740 may transmit, to the base station, a MAC-CE associated with the second message.

Figure 8:
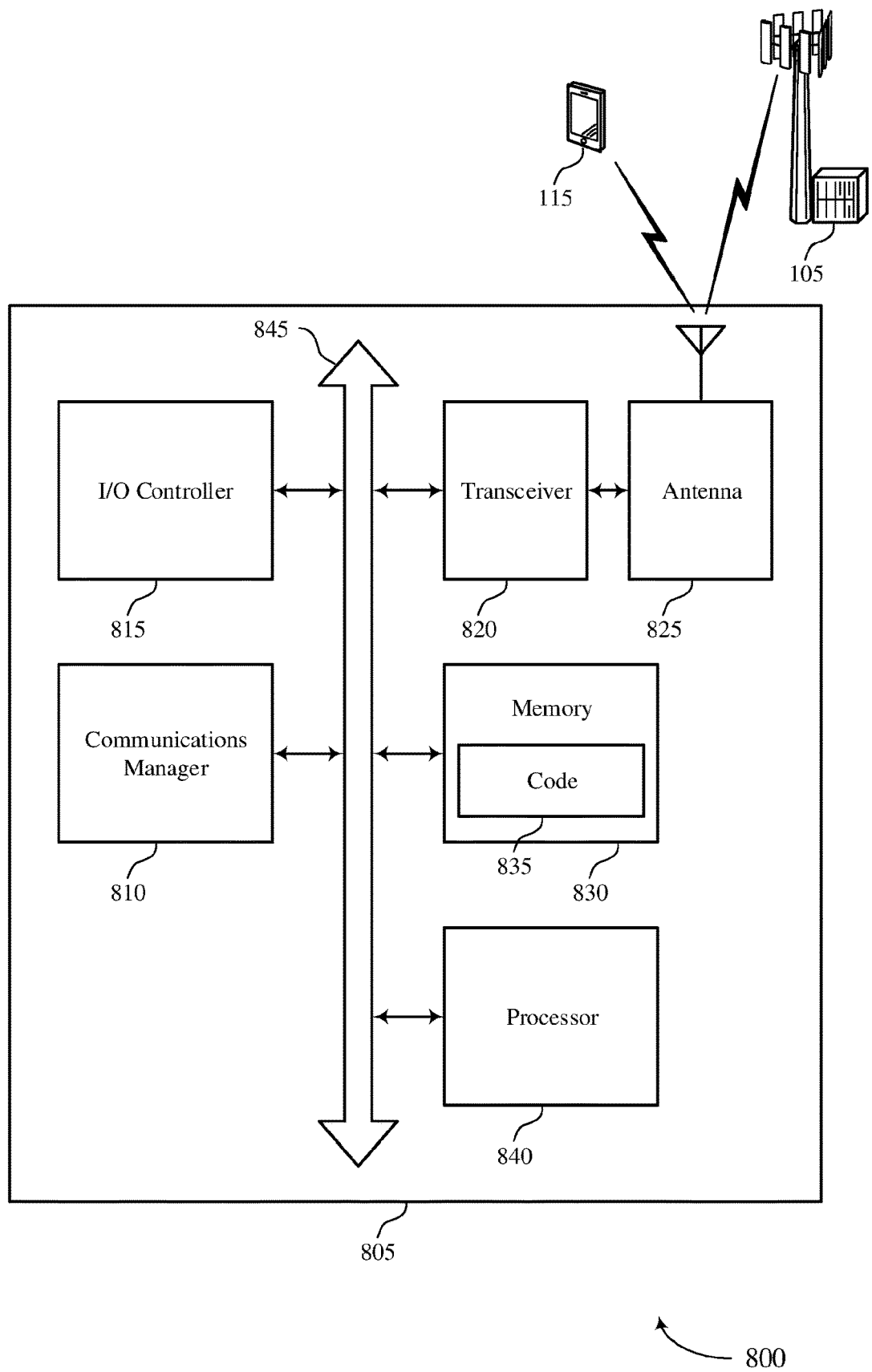
FIG. 8 shows a diagram of a system including a device that supports reporting for information aggregation in federated learning in accordance with aspects of the present disclosure.

FIG. 8 shows a diagram of a system 800 including a device 805 that supports reporting for information aggregation in federated learning in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a base station, a downlink control information message scheduling a first message transmitted using an unencoded uplink signal from the UE to the base station, where the unencoded uplink signal is associated with a concurrent transmission with other unencoded uplink signals for averaging information while the unencoded uplink signal is transmitted, transmit, using the unencoded uplink signal, the first message to the base station based on receiving the downlink control information message, and transmit, using an encoded uplink signal, a second message to the base station associated with the first message, the second message indicating that the downlink control information message was received.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting reporting for information aggregation in federated learning).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
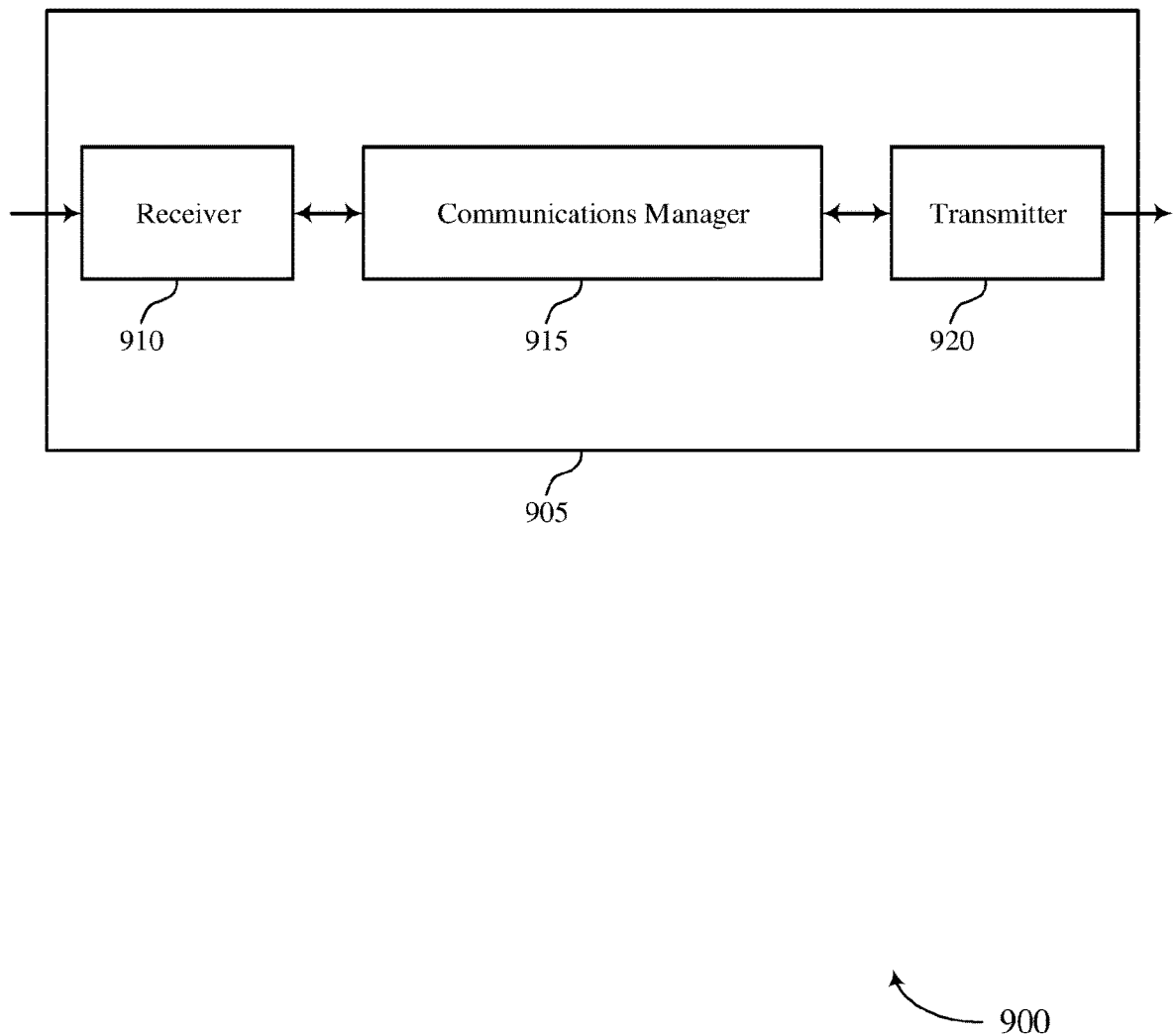
FIGS. 9 and 10 show block diagrams of devices that support reporting for information aggregation in federated learning in accordance with aspects of the present disclosure.

FIG. 9 shows a block diagram 900 of a device 905 that supports reporting for information aggregation in federated learning in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to reporting for information aggregation in federated learning, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, a downlink control information message scheduling a first message transmitted using an unencoded uplink signal from the UE to the base station, where the unencoded uplink signal is associated with a concurrent transmission with other unencoded uplink signals for averaging information while the unencoded uplink signal is received, monitor a first resource allocation for the first message transmitted using the unencoded uplink signal based on transmitting the downlink control information message, monitor a second resource allocation for a second message transmitted using an encoded uplink signal from the UE to the base station, and determine a value for averaging a set of unencoded uplink signals based on monitoring the second resource allocation for the second message. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

The communications manager 915 may be implemented to realize one or more potential advantages. In some implementations, the communications manager 915 may implement a federated learning operation with additional configuration of accompanying transmissions from participating devices (such as UEs) that provide reporting information associated with the unencoded uplink signal transmitted by the device. As such, the communications manager 915 may be aware of which devices actually transmit an unencoded uplink signal and, in some examples, what portion of an unencoded uplink signal some devices transmit, which may enable the communications manager 915 to determine more accurate values for averaging aggregate values derived from the reception of multiple unencoded uplink signals over a scheduled shared channel resource. Accordingly, the communications manager 915 may determine a more accurate global model, which may be associated with greater performance of an associated machine learning program and any related or involved applications.

Figure 10:
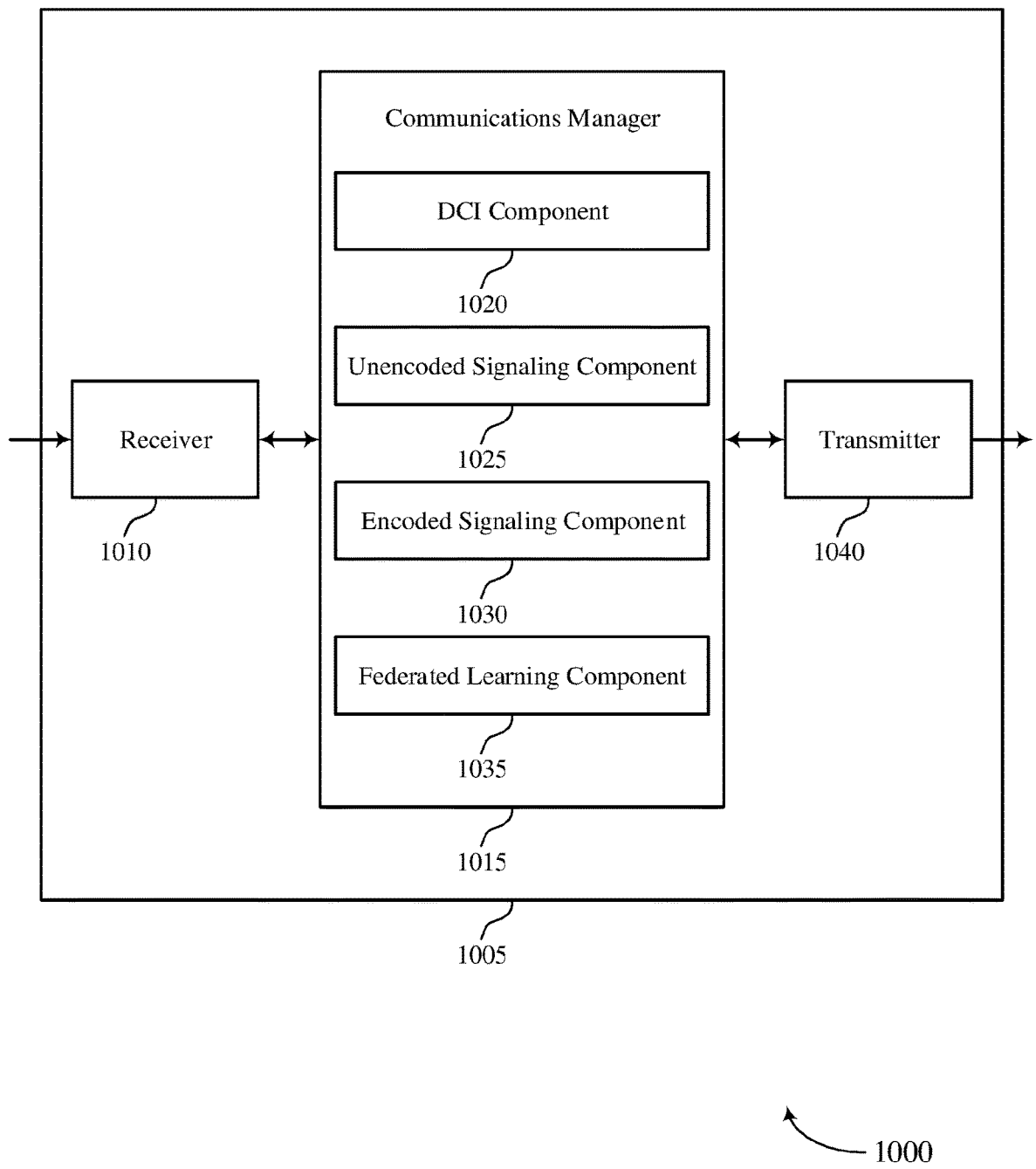

FIG. 10 shows a block diagram 1000 of a device 1005 that supports reporting for information aggregation in federated learning in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to reporting for information aggregation in federated learning, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a DCI component 1020, an unencoded signaling component 1025, an encoded signaling component 1030, and a federated learning component 1035. The communications manager 1015 may be an example of aspects of the communications manager 1210 described herein.

The DCI component 1020 may transmit, to a UE, a downlink control information message scheduling a first message transmitted using an unencoded uplink signal from the UE to the base station, where the unencoded uplink signal is associated with a concurrent transmission with other unencoded uplink signals for averaging information while the unencoded uplink signal is received.

The unencoded signaling component 1025 may monitor a first resource allocation for the first message transmitted using the unencoded uplink signal based on transmitting the downlink control information message. The encoded signaling component 1030 may monitor a second resource allocation for a second message transmitted using an encoded uplink signal from the UE to the base station. The federated learning component 1035 may determine a value for averaging a set of unencoded uplink signals based on monitoring the second resource allocation for the second message.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
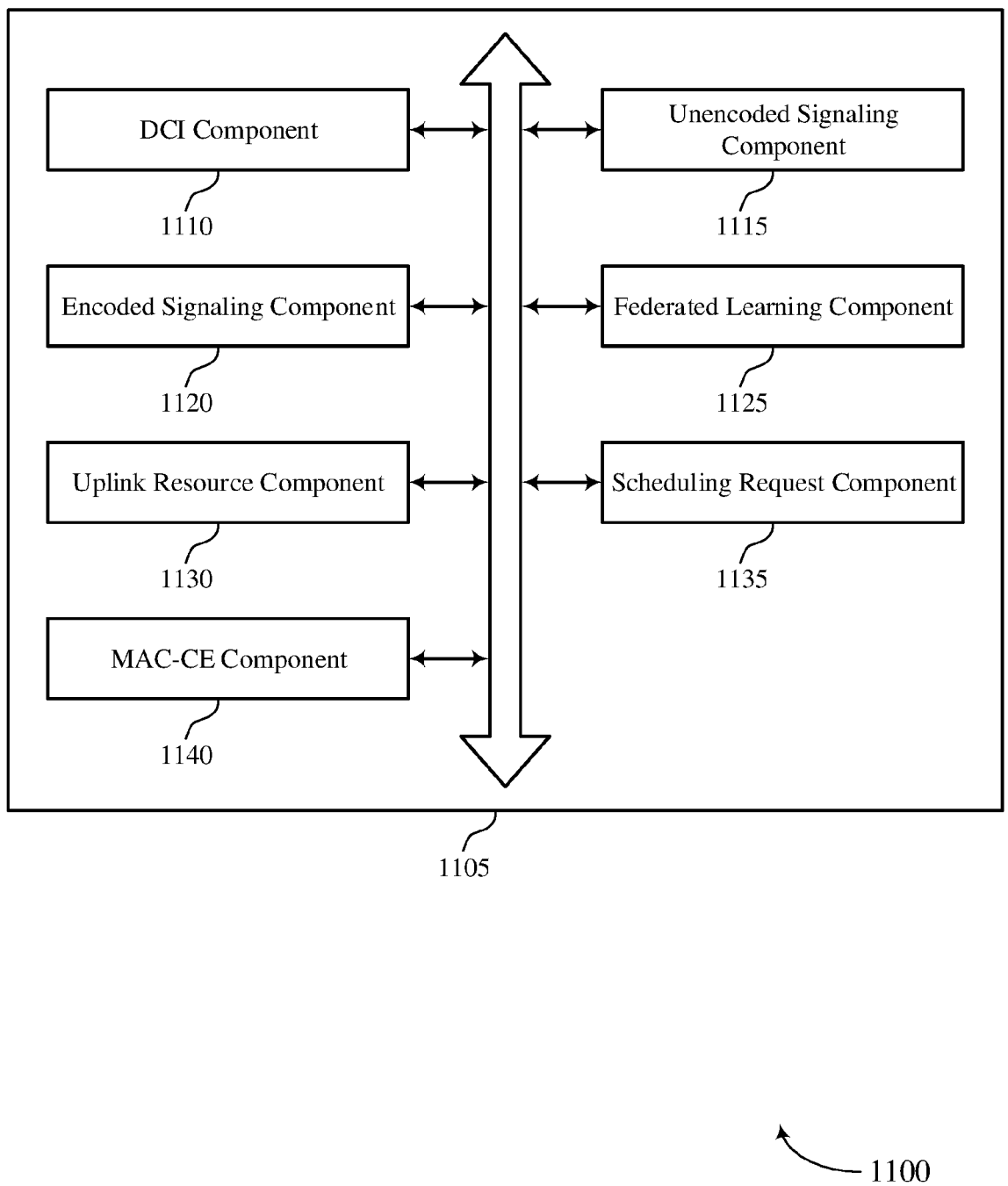
FIG. 11 shows a block diagram of a communications manager that supports reporting for information aggregation in federated learning in accordance with aspects of the present disclosure.

FIG. 11 shows a block diagram 1100 of a communications manager 1105 that supports reporting for information aggregation in federated learning in accordance with aspects of the present disclosure. The communications manager 1105 may be an example of aspects of a communications manager 915, a communications manager 1015, or a communications manager 1210 described herein. The communications manager 1105 may include a DCI component 1110, an unencoded signaling component 1115, an encoded signaling component 1120, a federated learning component 1125, an uplink resource component 1130, a scheduling request component 1135, and a MAC-CE component 1140. Each of these modules may communicate, directly or indirectly, with one another (e.g., via one or more buses).

The DCI component 1110 may transmit, to a UE, a downlink control information message scheduling a first message transmitted using an unencoded uplink signal from the UE to the base station, where the unencoded uplink signal is associated with a concurrent transmission with other unencoded uplink signals for averaging information while the unencoded uplink signal is received.

The unencoded signaling component 1115 may monitor a first resource allocation for the first message transmitted using the unencoded uplink signal based on transmitting the downlink control information message. In some examples, the unencoded signaling component 1115 may receive an acknowledgement included in the second message from the UE indicating that the first message was transmitted based on monitoring the second resource allocation for the second message, where determining the value for the averaging is based on receiving the second message.

In some examples, the unencoded signaling component 1115 may receive the set of unencoded uplink signals from a set of UEs. In some cases, the unencoded uplink signal includes an over-the-air computation signal.

The encoded signaling component 1120 may monitor a second resource allocation for a second message transmitted using an encoded uplink signal from the UE to the base station. In some examples, the encoded signaling component 1120 may receive an acknowledgement included in the second message from the UE indicating that the downlink control information message was received based on monitoring the second resource allocation for the second message, where determining the value for the averaging is based on receiving the second message.

In some examples, the encoded signaling component 1120 may receive, as part of the second message, an indication of one or more coefficient indexes corresponding to one or more coefficients associated with information included in the first message, where determining the value for the averaging is based on receiving the indication of the one or more coefficient indexes. In some examples, the encoded signaling component 1120 may fail to receive the second message from the UE over the second resource allocation, where determining the value for the averaging is based on failing to receive the second message.

In some examples, the encoded signaling component 1120 may monitor for, from the UE, a first part of the second message over a first set of resources. In some examples, the encoded signaling component 1120 may monitor for, from the UE, a second part of the second message over a second set of resources. In some cases, the first part of the second message includes an indication of a quantity of one or more coefficients associated with information of the first message and the second part of the second message includes one or more indexes corresponding to the one or more coefficients.

The federated learning component 1125 may determine a value for averaging a set of unencoded uplink signals based on monitoring the second resource allocation for the second message. In some examples, the federated learning component 1125 may determine the averaging of the set of unencoded uplink signals based on the value.

The uplink resource component 1130 may determine the second resource allocation for the second message transmitted using the encoded uplink signal from the UE to the base station based on transmitting the downlink control information message, where monitoring the second resource allocation for the second message is based on determining the second resource allocation. In some examples, the uplink resource component 1130 may determine the second resource allocation for the second message based on receiving the scheduling request.

In some examples, the uplink resource component 1130 may transmit, to the UE, an indication of the second resource allocation for the second message based on determining the second resource allocation. In some examples, the uplink resource component 1130 may determine the second resource allocation for the second message based on receiving the MAC control element.

In some examples, the uplink resource component 1130 may transmit, to the UE, an indication of the second set of resources based on receiving the first part of the second message over the first set of resources, where the first part of the second message indicates a size of the second part of the second message. In some examples, the uplink resource component 1130 may transmit an indication of the second resource allocation.

In some cases, the first resource allocation or the second resource allocation includes a resource element group, the resource element group corresponding to the UE. In some cases, the first resource allocation or the second resource allocation includes a resource of a physical uplink control channel or a resource of a physical uplink shared channel, or a combination thereof.

The scheduling request component 1135 may receive, from the UE, a scheduling request associated with the second message. The MAC-CE component 1140 may receive, from the UE, a MAC-CE associated with the second message.

Figure 12:
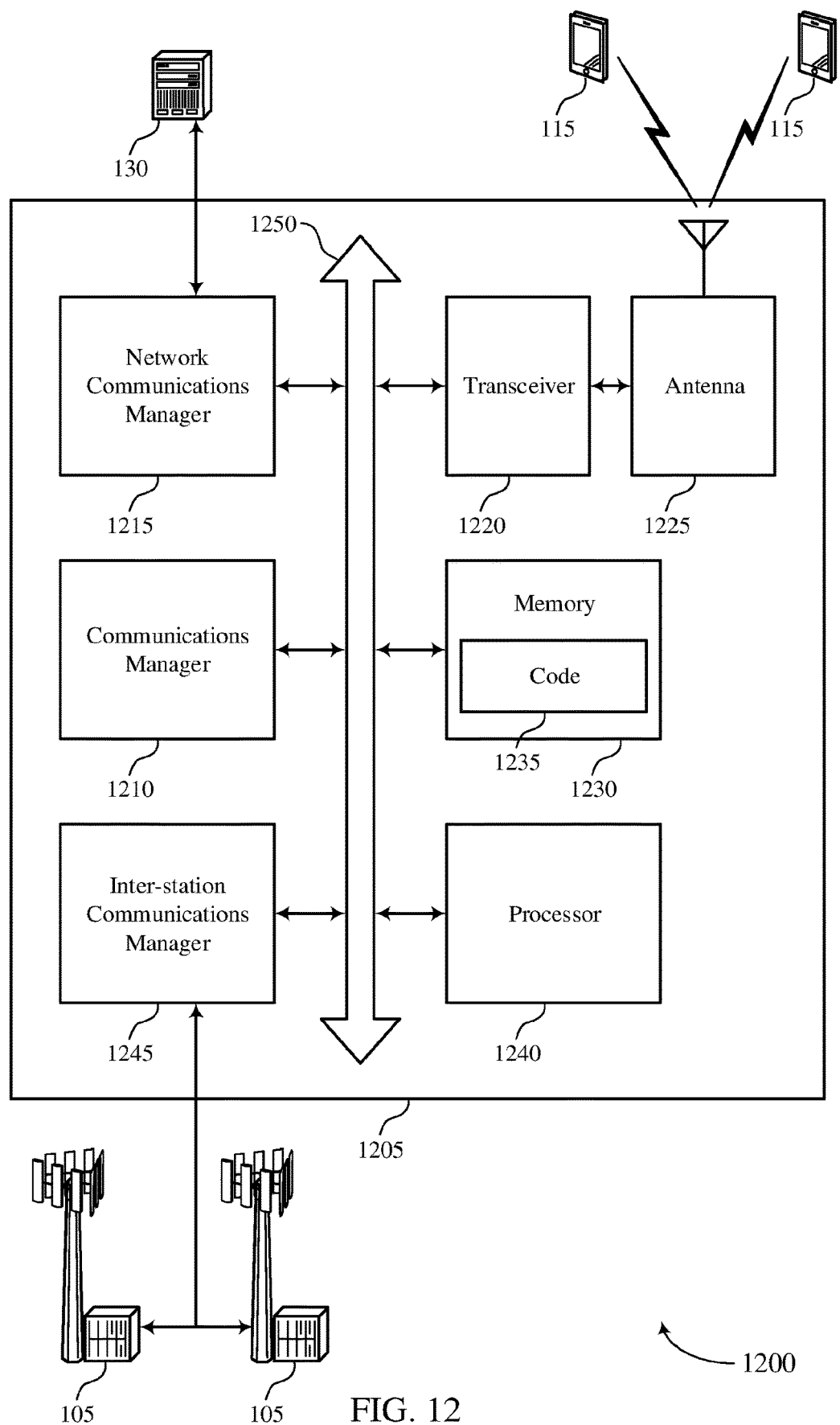
FIG. 12 shows a diagram of a system including a device that supports reporting for information aggregation in federated learning in accordance with aspects of the present disclosure.

FIG. 12 shows a diagram of a system 1200 including a device 1205 that supports reporting for information aggregation in federated learning in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, a downlink control information message scheduling a first message transmitted using an unencoded uplink signal from the UE to the base station, where the unencoded uplink signal is associated with a concurrent transmission with other unencoded uplink signals for averaging information while the unencoded uplink signal is received, monitor a first resource allocation for the first message transmitted using the unencoded uplink signal based on transmitting the downlink control information message, monitor a second resource allocation for a second message transmitted using an encoded uplink signal from the UE to the base station, and determine a value for averaging a set of unencoded uplink signals based on monitoring the second resource allocation for the second message.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting reporting for information aggregation in federated learning).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
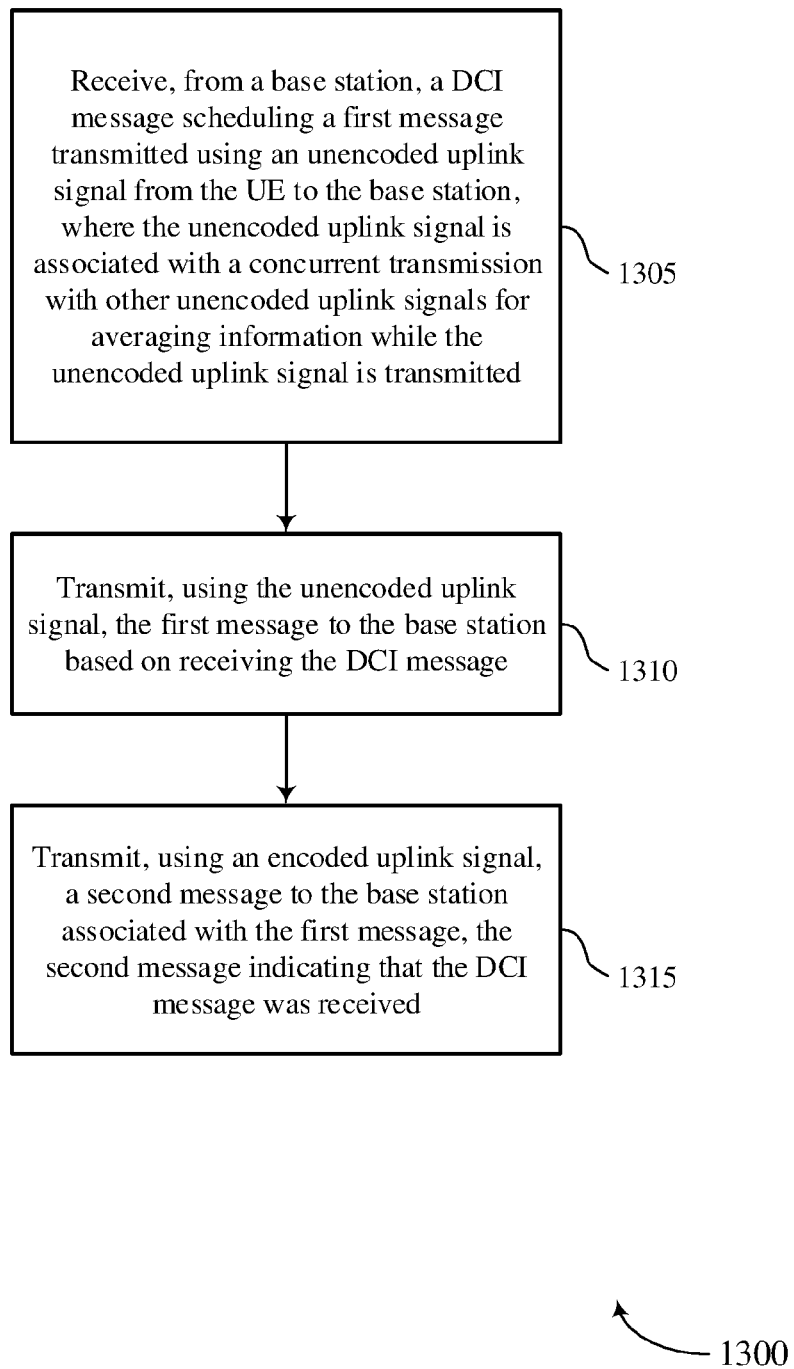
FIGS. 13 through 20 show flowcharts illustrating methods that support reporting for information aggregation in federated learning in accordance with aspects of the present disclosure.

FIG. 13 shows a flowchart illustrating a method 1300 that supports reporting for information aggregation in federated learning in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a base station, a DCI message scheduling a first message transmitted using an unencoded uplink signal from the UE to the base station, where the unencoded uplink signal is associated with a concurrent transmission with other unencoded uplink signals for averaging information while the unencoded uplink signal is transmitted. The operations of 1305 may be performed according to the methods described herein. In some examples, aspects of the operations of 1305 may be performed by a DCI component as described with reference to FIGS. 5 through 8.

At 1310, the UE may transmit, using the unencoded uplink signal, the first message to the base station based on receiving the DCI message. The operations of 1310 may be performed according to the methods described herein. In some examples, aspects of the operations of 1310 may be performed by an unencoded signaling component as described with reference to FIGS. 5 through 8.

At 1315, the UE may transmit, using an encoded uplink signal, a second message to the base station associated with the first message, the second message indicating that the DCI message was received. The operations of 1315 may be performed according to the methods described herein. In some examples, aspects of the operations of 1315 may be performed by a reporting component as described with reference to FIGS. 5 through 8.

Figure 14:
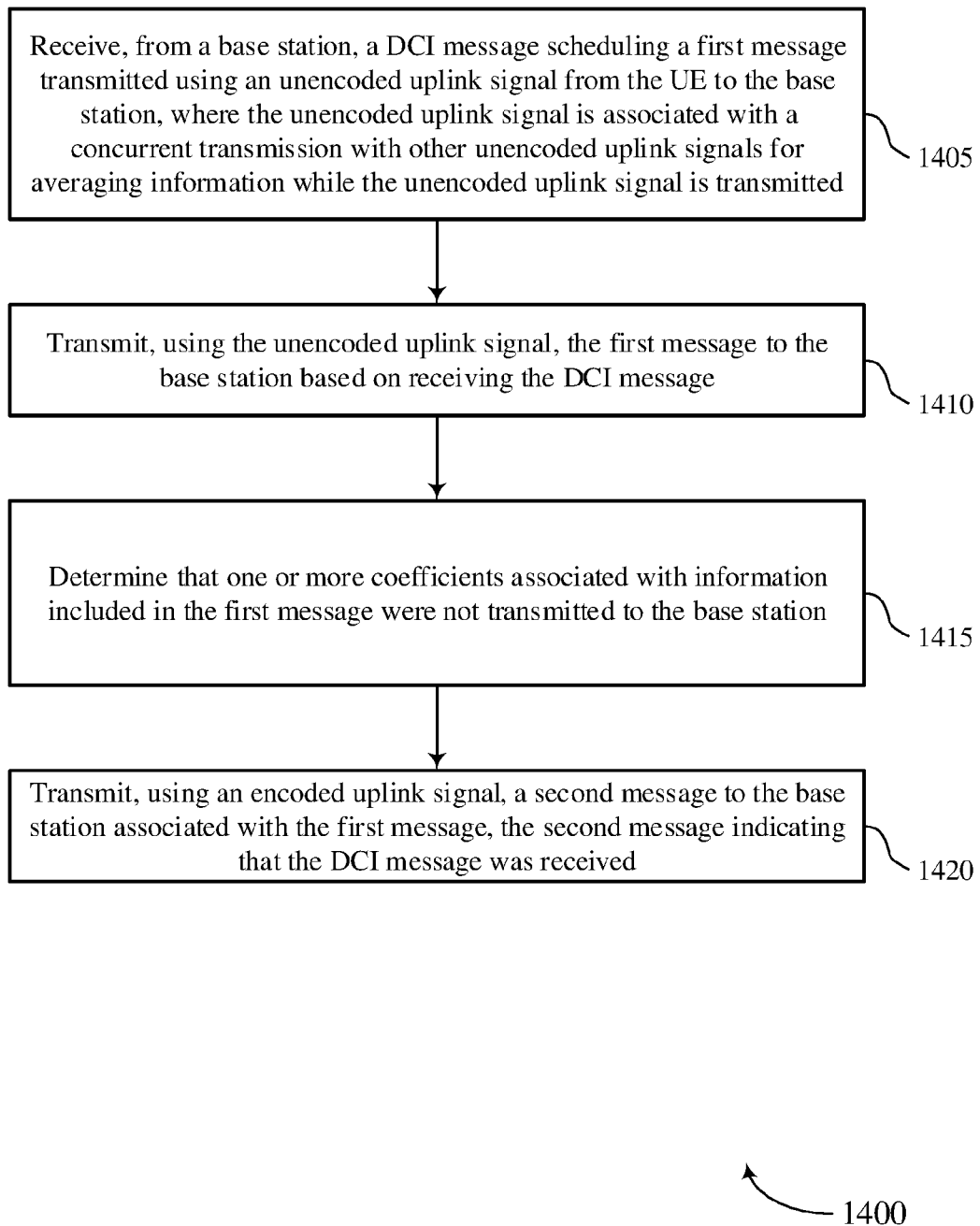

FIG. 14 shows a flowchart illustrating a method 1400 that supports reporting for information aggregation in federated learning in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a DCI message scheduling a first message transmitted using an unencoded uplink signal from the UE to the base station, where the unencoded uplink signal is associated with a concurrent transmission with other unencoded uplink signals for averaging information while the unencoded uplink signal is transmitted. The operations of 1405 may be performed according to the methods described herein. In some examples, aspects of the operations of 1405 may be performed by a DCI component as described with reference to FIGS. 5 through 8.

At 1410, the UE may transmit, using the unencoded uplink signal, the first message to the base station based on receiving the DCI message. The operations of 1410 may be performed according to the methods described herein. In some examples, aspects of the operations of 1410 may be performed by an unencoded signaling component as described with reference to FIGS. 5 through 8.

At 1415, the UE may determine that one or more coefficients associated with information included in the first message were not transmitted to the base station. In some examples, the second message includes an indication of one or more coefficient indexes corresponding to the one or more coefficients that were not transmitted to the base station. The operations of 1415 may be performed according to the methods described herein. In some examples, aspects of the operations of 1415 may be performed by a truncating component as described with reference to FIGS. 5 through 8.

At 1420, the UE may transmit, using an encoded uplink signal, a second message to the base station associated with the first message, the second message indicating that the DCI message was received. In some examples, the second message includes an indication of one or more coefficient indexes corresponding to the one or more coefficients that were not transmitted to the base station. The operations of 1420 may be performed according to the methods described herein. In some examples, aspects of the operations of 1420 may be performed by a reporting component as described with reference to FIGS. 5 through 8.

Figure 15:
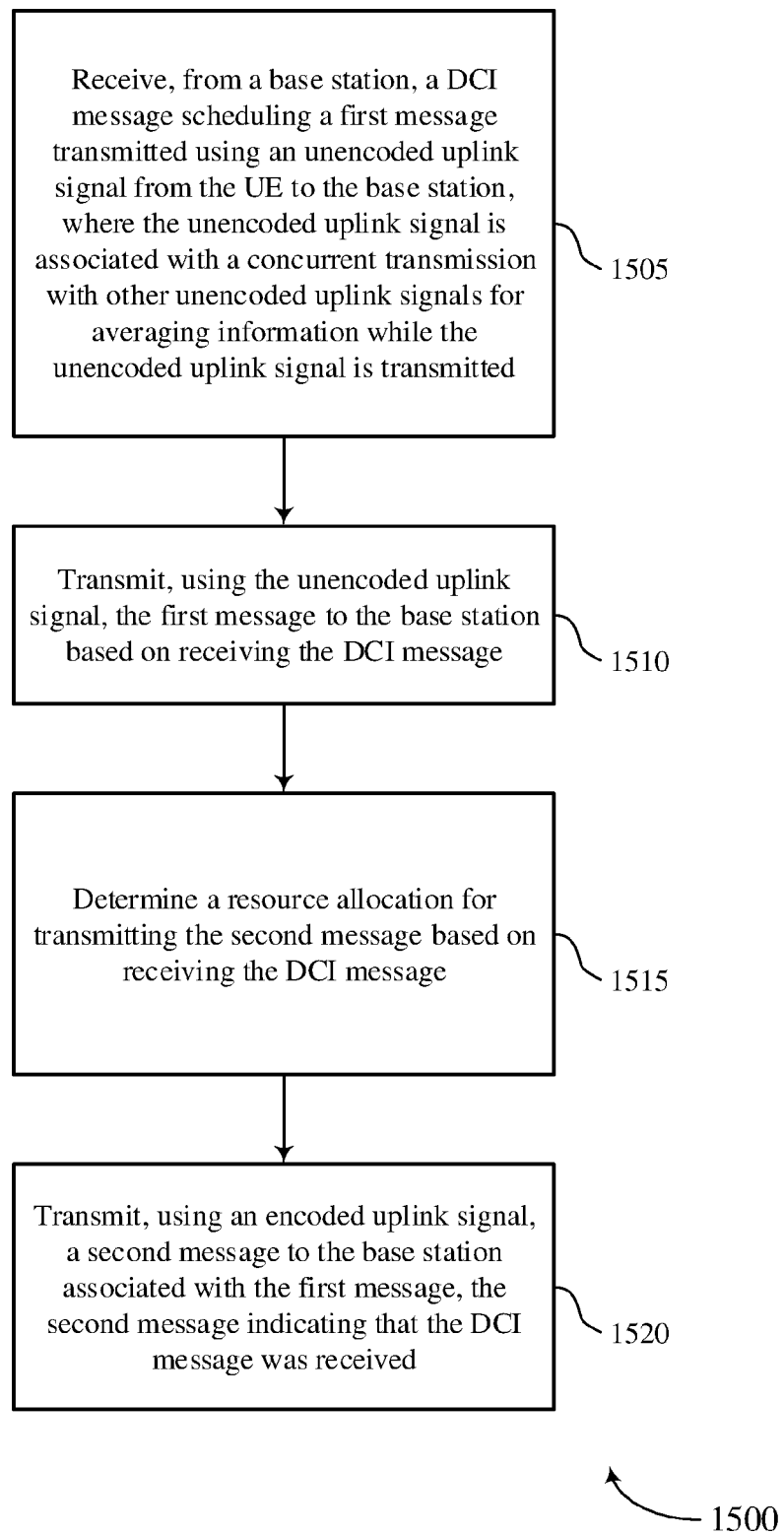

FIG. 15 shows a flowchart illustrating a method 1500 that supports reporting for information aggregation in federated learning in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a DCI message scheduling a first message transmitted using an unencoded uplink signal from the UE to the base station, where the unencoded uplink signal is associated with a concurrent transmission with other unencoded uplink signals for averaging information while the unencoded uplink signal is transmitted. The operations of 1505 may be performed according to the methods described herein. In some examples, aspects of the operations of 1505 may be performed by a DCI component as described with reference to FIGS. 5 through 8.

At 1510, the UE may transmit, using the unencoded uplink signal, the first message to the base station based on receiving the DCI message. The operations of 1510 may be performed according to the methods described herein. In some examples, aspects of the operations of 1510 may be performed by an unencoded signaling component as described with reference to FIGS. 5 through 8.

At 1515, the UE may determine a resource allocation for transmitting the second message based on receiving the DCI message. The operations of 1515 may be performed according to the methods described herein. In some examples, aspects of the operations of 1515 may be performed by an uplink resource component as described with reference to FIGS. 5 through 8.

At 1520, the UE may transmit, using an encoded uplink signal, a second message to the base station associated with the first message, the second message indicating that the DCI message was received. In some examples, transmitting the second message to the base station is based on determining the resource allocation. The operations of 1520 may be performed according to the methods described herein. In some examples, aspects of the operations of 1520 may be performed by a reporting component as described with reference to FIGS. 5 through 8.

Figure 16:
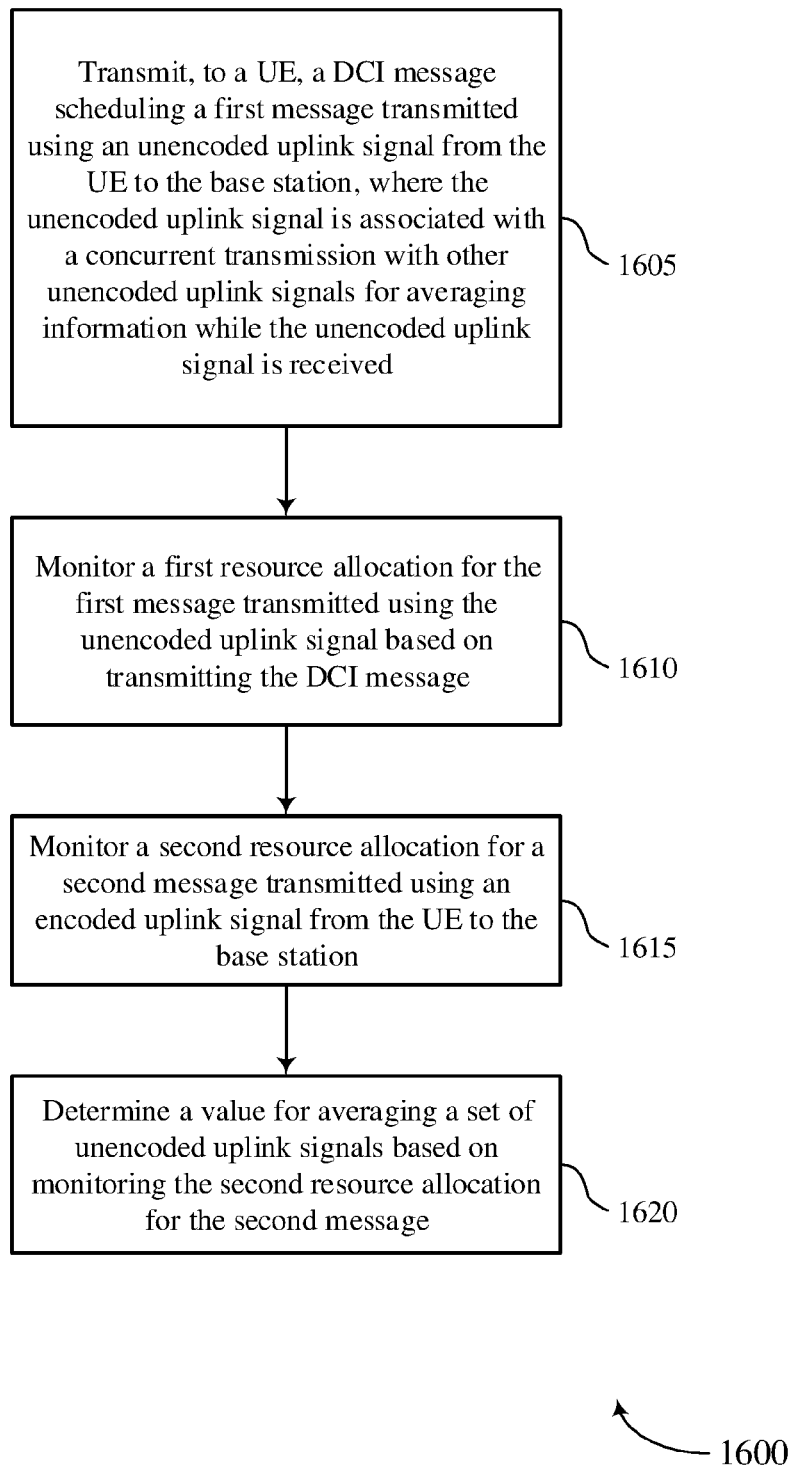

FIG. 16 shows a flowchart illustrating a method 1600 that supports reporting for information aggregation in federated learning in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to a UE, a DCI message scheduling a first message transmitted using an unencoded uplink signal from the UE to the base station, where the unencoded uplink signal is associated with a concurrent transmission with other unencoded uplink signals for averaging information while the unencoded uplink signal is received. The operations of 1605 may be performed according to the methods described herein. In some examples, aspects of the operations of 1605 may be performed by a DCI component as described with reference to FIGS. 9 through 12.

At 1610, the base station may monitor a first resource allocation for the first message transmitted using the unencoded uplink signal based on transmitting the DCI message. The operations of 1610 may be performed according to the methods described herein. In some examples, aspects of the operations of 1610 may be performed by an unencoded signaling component as described with reference to FIGS. 9 through 12.

At 1615, the base station may monitor a second resource allocation for a second message transmitted using an encoded uplink signal from the UE to the base station. The operations of 1615 may be performed according to the methods described herein. In some examples, aspects of the operations of 1615 may be performed by an encoded signaling component as described with reference to FIGS. 9 through 12.

At 1620, the base station may determine a value for averaging a set of unencoded uplink signals based on monitoring the second resource allocation for the second message. The operations of 1620 may be performed according to the methods described herein. In some examples, aspects of the operations of 1620 may be performed by a federated learning component as described with reference to FIGS. 9 through 12.

Figure 17:
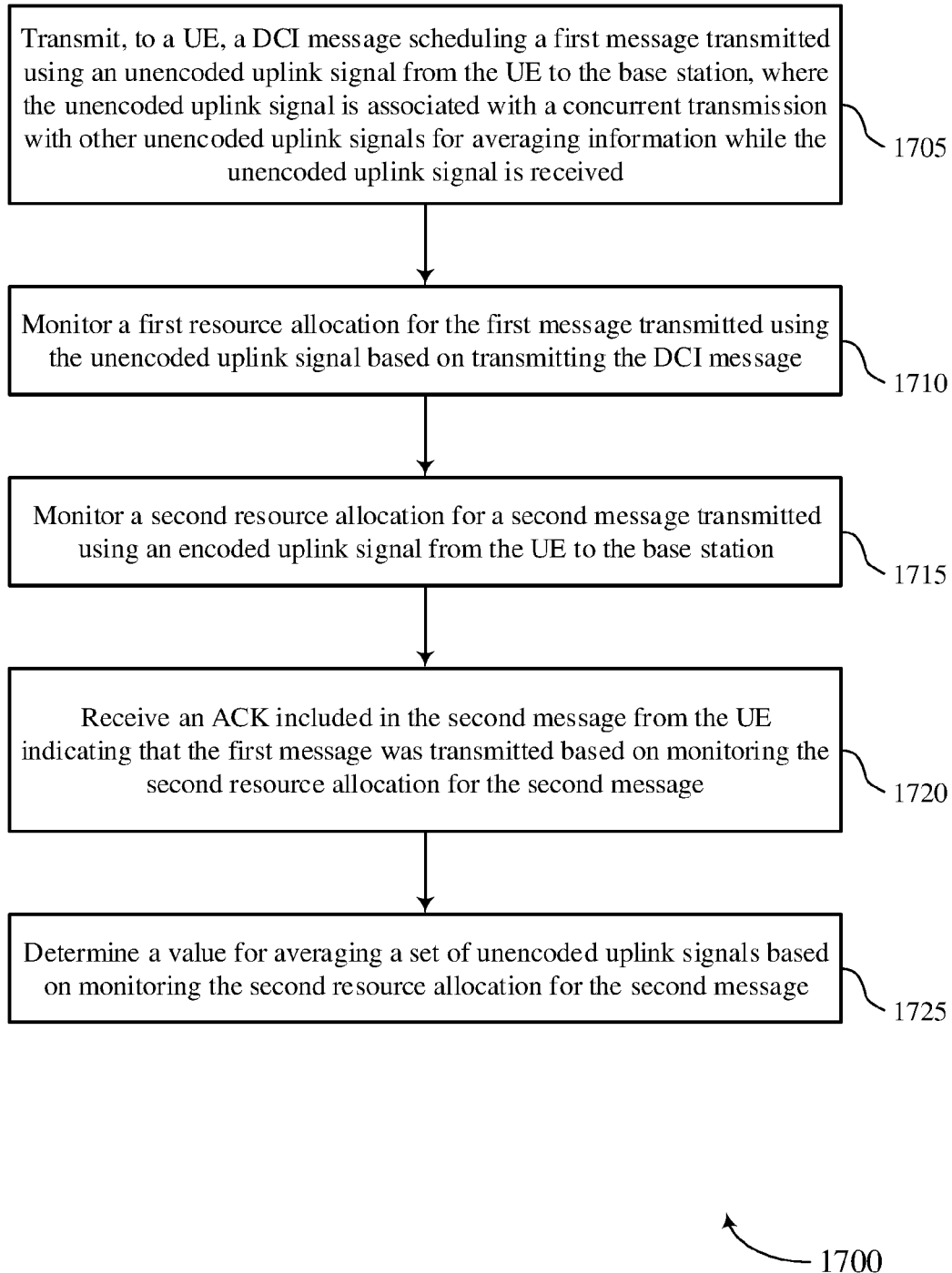

FIG. 17 shows a flowchart illustrating a method 1700 that supports reporting for information aggregation in federated learning in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a UE, a DCI message scheduling a first message transmitted using an unencoded uplink signal from the UE to the base station, where the unencoded uplink signal is associated with a concurrent transmission with other unencoded uplink signals for averaging information while the unencoded uplink signal is received. The operations of 1705 may be performed according to the methods described herein. In some examples, aspects of the operations of 1705 may be performed by a DCI component as described with reference to FIGS. 9 through 12.

At 1710, the base station may monitor a first resource allocation for the first message transmitted using the unencoded uplink signal based on transmitting the DCI message. The operations of 1710 may be performed according to the methods described herein. In some examples, aspects of the operations of 1710 may be performed by an unencoded signaling component as described with reference to FIGS. 9 through 12.

At 1715, the base station may monitor a second resource allocation for a second message transmitted using an encoded uplink signal from the UE to the base station. The operations of 1715 may be performed according to the methods described herein. In some examples, aspects of the operations of 1715 may be performed by an encoded signaling component as described with reference to FIGS. 9 through 12.

At 1720, the base station may receive an ACK included in the second message from the UE indicating that the first message was transmitted based on monitoring the second resource allocation for the second message. The operations of 1720 may be performed according to the methods described herein. In some examples, aspects of the operations of 1720 may be performed by an unencoded signaling component as described with reference to FIGS. 9 through 12.

At 1725, the base station may determine a value for averaging a set of unencoded uplink signals based on monitoring the second resource allocation for the second message. In some examples, determining the value for the averaging is based on receiving the second message. The operations of 1725 may be performed according to the methods described herein. In some examples, aspects of the operations of 1725 may be performed by a federated learning component as described with reference to FIGS. 9 through 12.

Figure 18:
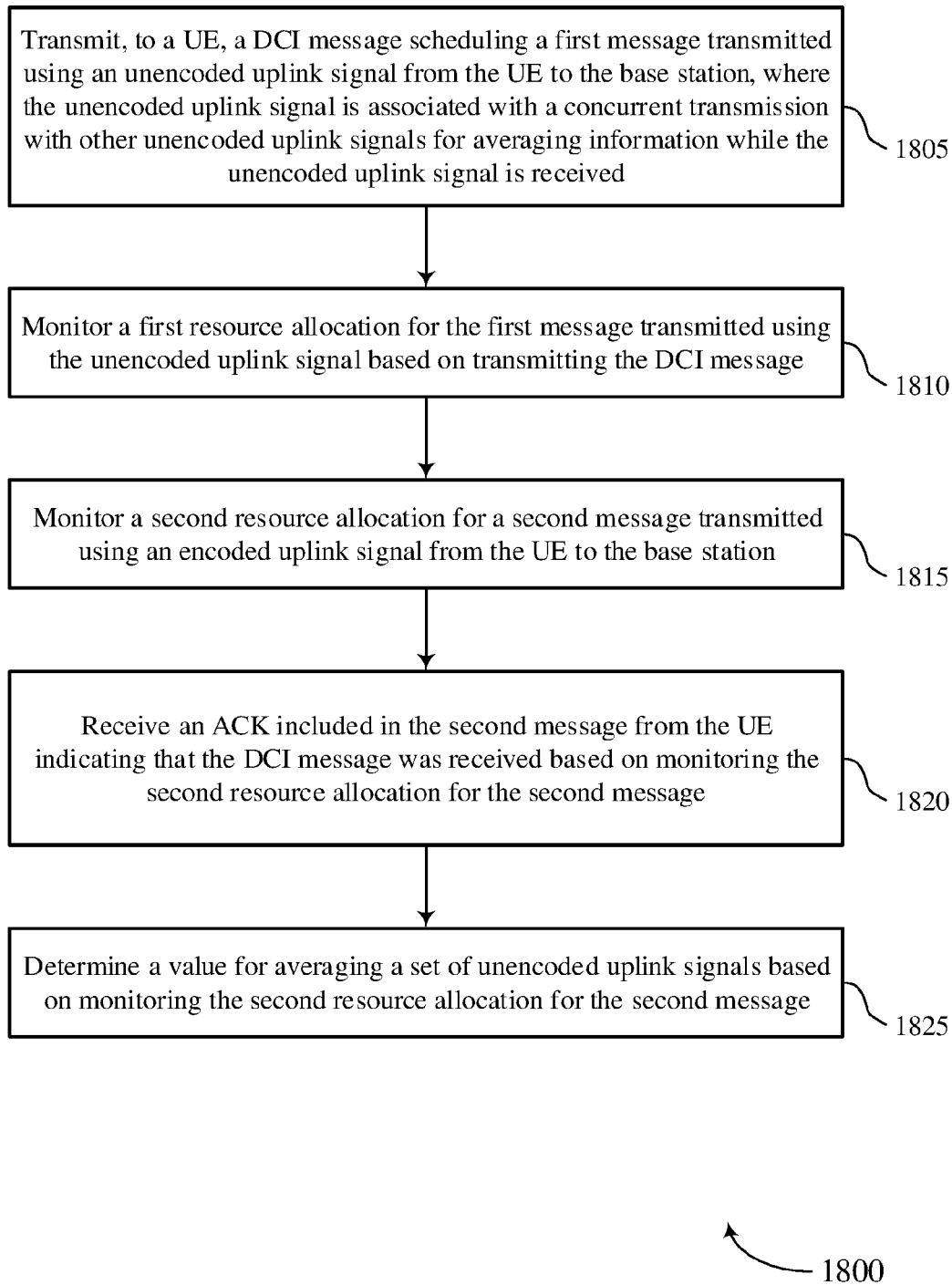

FIG. 18 shows a flowchart illustrating a method 1800 that supports reporting for information aggregation in federated learning in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1805, the base station may transmit, to a UE, a DCI message scheduling a first message transmitted using an unencoded uplink signal from the UE to the base station, where the unencoded uplink signal is associated with a concurrent transmission with other unencoded uplink signals for averaging information while the unencoded uplink signal is received. The operations of 1805 may be performed according to the methods described herein. In some examples, aspects of the operations of 1805 may be performed by a DCI component as described with reference to FIGS. 9 through 12.

At 1810, the base station may monitor a first resource allocation for the first message transmitted using the unencoded uplink signal based on transmitting the DCI message. The operations of 1810 may be performed according to the methods described herein. In some examples, aspects of the operations of 1810 may be performed by an unencoded signaling component as described with reference to FIGS. 9 through 12.

At 1815, the base station may monitor a second resource allocation for a second message transmitted using an encoded uplink signal from the UE to the base station. The operations of 1815 may be performed according to the methods described herein. In some examples, aspects of the operations of 1815 may be performed by an encoded signaling component as described with reference to FIGS. 9 through 12.

At 1820, the base station may receive an ACK included in the second message from the UE indicating that the DCI message was received based on monitoring the second resource allocation for the second message. The operations of 1820 may be performed according to the methods described herein. In some examples, aspects of the operations of 1820 may be performed by an encoded signaling component as described with reference to FIGS. 9 through 12.

At 1825, the base station may determine a value for averaging a set of unencoded uplink signals based on monitoring the second resource allocation for the second message. In some examples, determining the value for the averaging is based on receiving the second message. The operations of 1825 may be performed according to the methods described herein. In some examples, aspects of the operations of 1825 may be performed by a federated learning component as described with reference to FIGS. 9 through 12.

Figure 19:
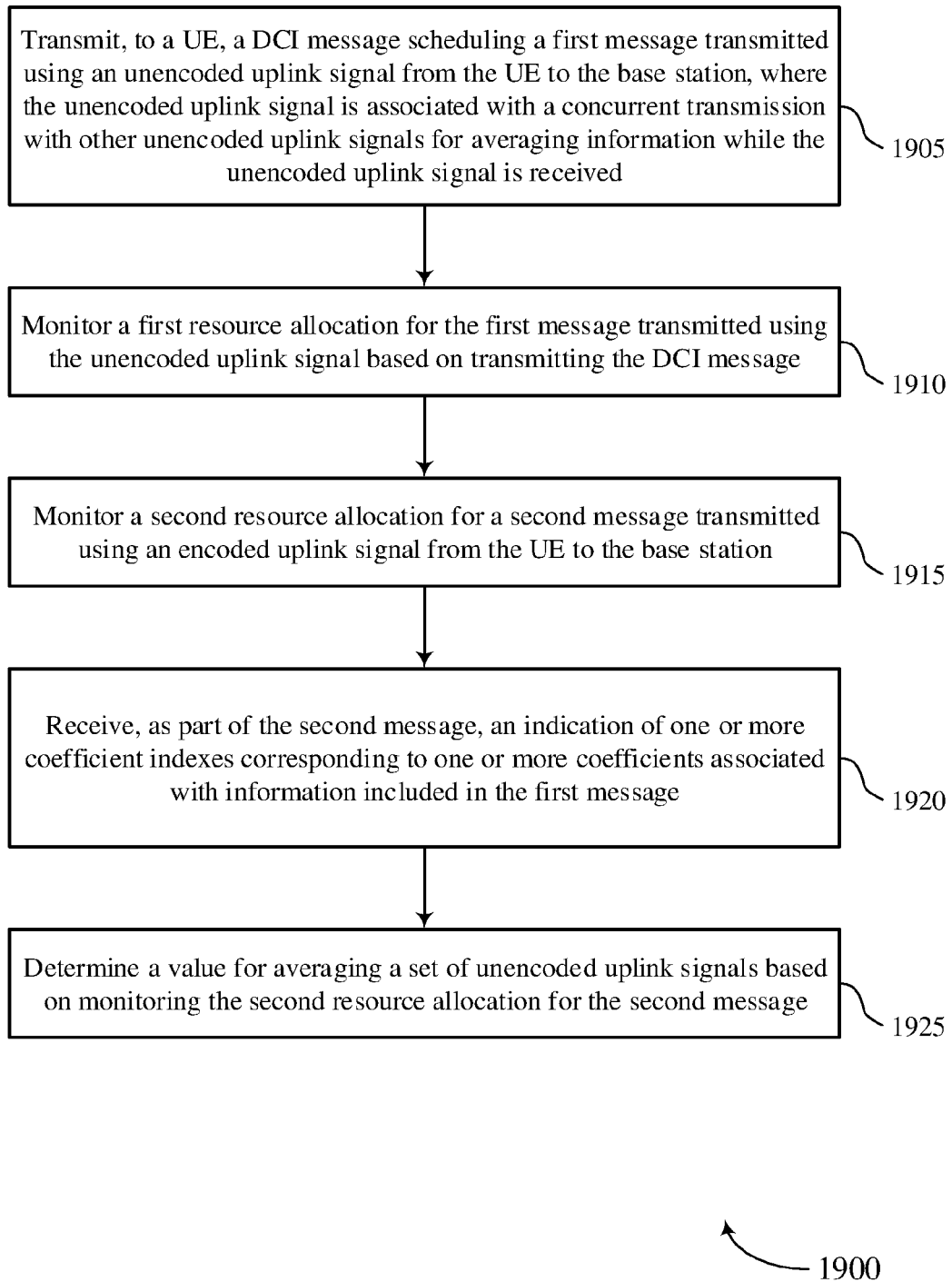

FIG. 19 shows a flowchart illustrating a method 1900 that supports reporting for information aggregation in federated learning in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1905, the base station may transmit, to a UE, a DCI message scheduling a first message transmitted using an unencoded uplink signal from the UE to the base station, where the unencoded uplink signal is associated with a concurrent transmission with other unencoded uplink signals for averaging information while the unencoded uplink signal is received. The operations of 1905 may be performed according to the methods described herein. In some examples, aspects of the operations of 1905 may be performed by a DCI component as described with reference to FIGS. 9 through 12.

At 1910, the base station may monitor a first resource allocation for the first message transmitted using the unencoded uplink signal based on transmitting the DCI message. The operations of 1910 may be performed according to the methods described herein. In some examples, aspects of the operations of 1910 may be performed by an unencoded signaling component as described with reference to FIGS. 9 through 12.

At 1915, the base station may monitor a second resource allocation for a second message transmitted using an encoded uplink signal from the UE to the base station. The operations of 1915 may be performed according to the methods described herein. In some examples, aspects of the operations of 1915 may be performed by an encoded signaling component as described with reference to FIGS. 9 through 12.

At 1920, the base station may receive, as part of the second message, an indication of one or more coefficient indexes corresponding to one or more coefficients associated with information included in the first message. The operations of 1920 may be performed according to the methods described herein. In some examples, aspects of the operations of 1920 may be performed by an encoded signaling component as described with reference to FIGS. 9 through 12.

At 1925, the base station may determine a value for averaging a set of unencoded uplink signals based on monitoring the second resource allocation for the second message. In some examples, determining the value for the averaging is based on receiving the indication of the one or more coefficient indexes. The operations of 1925 may be performed according to the methods described herein. In some examples, aspects of the operations of 1925 may be performed by a federated learning component as described with reference to FIGS. 9 through 12.

Figure 20:
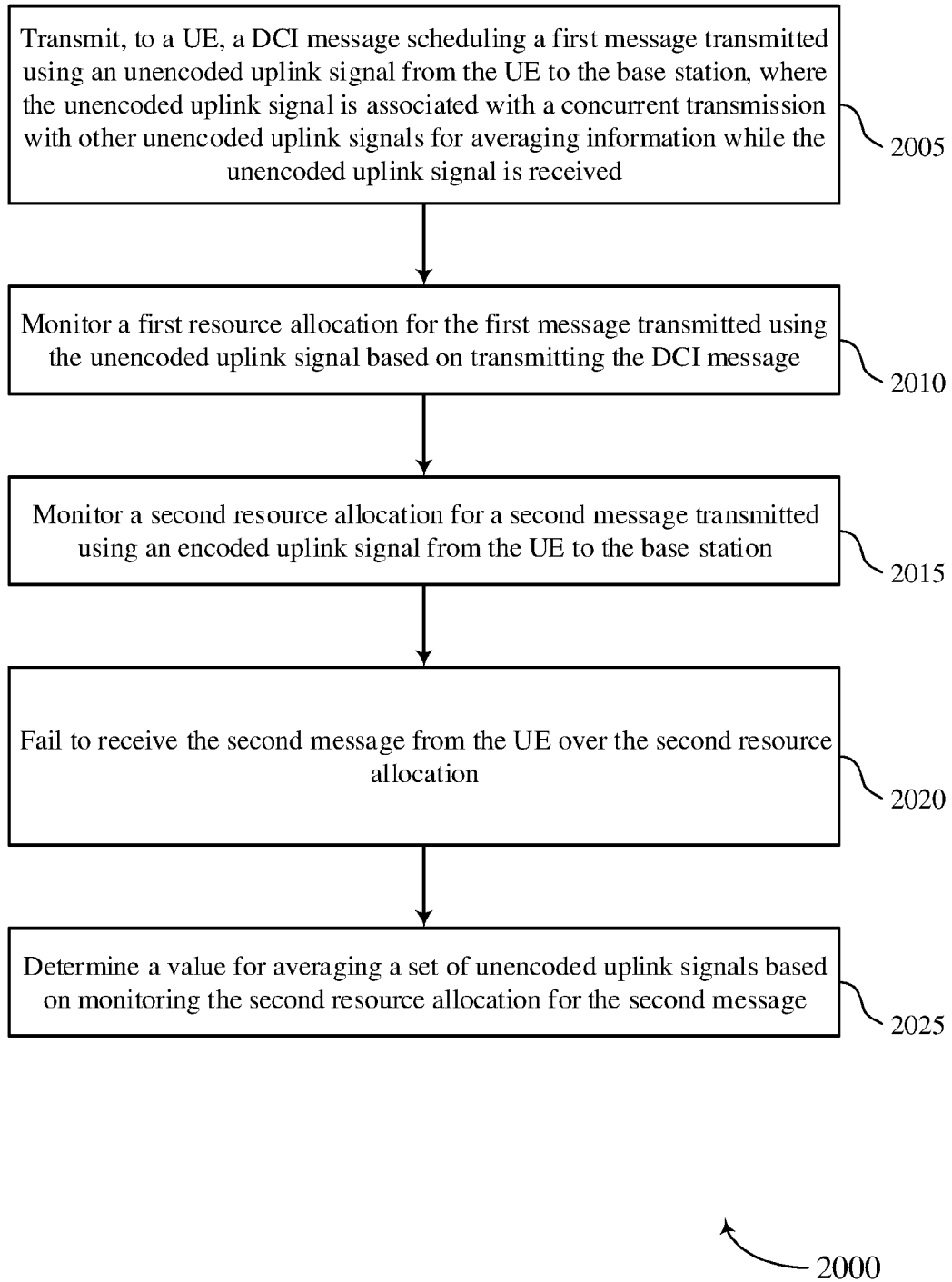

FIG. 20 shows a flowchart illustrating a method 2000 that supports reporting for information aggregation in federated learning in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 2005, the base station may transmit, to a UE, a DCI message scheduling a first message transmitted using an unencoded uplink signal from the UE to the base station, where the unencoded uplink signal is associated with a concurrent transmission with other unencoded uplink signals for averaging information while the unencoded uplink signal is received. The operations of 2005 may be performed according to the methods described herein. In some examples, aspects of the operations of 2005 may be performed by a DCI component as described with reference to FIGS. 9 through 12.

At 2010, the base station may monitor a first resource allocation for the first message transmitted using the unencoded uplink signal based on transmitting the DCI message. The operations of 2010 may be performed according to the methods described herein. In some examples, aspects of the operations of 2010 may be performed by an unencoded signaling component as described with reference to FIGS. 9 through 12.

At 2015, the base station may monitor a second resource allocation for a second message transmitted using an encoded uplink signal from the UE to the base station. The operations of 2015 may be performed according to the methods described herein. In some examples, aspects of the operations of 2015 may be performed by an encoded signaling component as described with reference to FIGS. 9 through 12.

At 2020, the base station may fail to receive the second message from the UE over the second resource allocation. The operations of 2020 may be performed according to the methods described herein. In some examples, aspects of the operations of 2020 may be performed by an encoded signaling component as described with reference to FIGS. 9 through 12.

At 2025, the base station may determine a value for averaging a set of unencoded uplink signals based on monitoring the second resource allocation for the second message. In some examples, determining the value for the averaging is based at least in part on failing to receive the second message. The operations of 2025 may be performed according to the methods described herein. In some examples, aspects of the operations of 2025 may be performed by a federated learning component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station, a downlink control information message scheduling a first message transmitted using an unencoded uplink signal from the UE to the base station, wherein the unencoded uplink signal is associated with a concurrent transmission with other unencoded uplink signals for averaging information while the unencoded uplink signal is transmitted;
   transmitting, using the unencoded uplink signal, the first message to the base station based at least in part on receiving the downlink control information message; and
   transmitting, using an encoded uplink signal, a second message to the base station associated with the first message, the second message indicating that the downlink control information message was received.

2. The method of claim 1, wherein transmitting the second message to the base station comprises:
   transmitting an acknowledgement associated with the first message, the acknowledgement indicating that the first message was transmitted.

3. The method of claim 1, wherein transmitting the second message to the base station comprises:
   transmitting an acknowledgement associated with the downlink control information message, the acknowledgement indicating that the downlink control information message was received.

4. The method of claim 1, wherein transmitting the second message to the base station comprises:
   transmitting one or more coefficient indexes associated with information included in the first message.

5. The method of claim 1, further comprising:
   determining that one or more coefficients associated with information included in the first message were not transmitted to the base station, wherein the second message comprises an indication of one or more coefficient indexes corresponding to the one or more coefficients that were not transmitted to the base station.

6. The method of claim 5, further comprising:
   truncating the one or more coefficients from the first message based at least in part on a power limitation of the UE, wherein determining that the one or more coefficients were not transmitted to the base station is based at least in part on truncating the one or more coefficients from the first message.

7. The method of claim 1, further comprising:
   determining a resource allocation for transmitting the second message based at least in part on receiving the downlink control information message, wherein transmitting the second message to the base station is based at least in part on determining the resource allocation.

8. The method of claim 7, further comprising:
   transmitting, to the base station, a scheduling request associated with the second message; and
   receiving, from the base station, an indication of the resource allocation for transmitting the second message based at least in part on transmitting the scheduling request, wherein determining the resource allocation is based at least in part on receiving the indication of the resource allocation.

9. The method of claim 7, further comprising:
   transmitting, to the base station, a medium access control (MAC) control element associated with the second message; and
   receiving, from the base station, an indication of the resource allocation for transmitting the second message based at least in part on transmitting the MAC control element, wherein determining the resource allocation is based at least in part on receiving the indication of the resource allocation.

10. The method of claim 7, wherein determining the resource allocation for transmitting the second message comprises:
    determining the resource allocation based at least in part on the downlink control information message; or
    determining an uplink resource based at least in part on a configuration.

11. The method of claim 1, wherein transmitting the second message comprises:
    transmitting a first part of the second message over a first set of resources; and
    transmitting a second part of the second message over a second set of resources.

12. The method of claim 11, further comprising:
    receiving an indication of the second set of resources based at least in part on transmitting the first part of the second message over the first set of resources, wherein the first part of the second message indicates a size of the second part of the second message.

13. The method of claim 11, wherein the first part of the second message comprises an indication of a quantity of one or more coefficients associated with information of the first message and the second part of the second message comprises one or more coefficient indexes corresponding to the one or more coefficients.

14. An apparatus for wireless communication at a user equipment (UE), comprising:
    a processor,
    memory coupled with the processor; and
    instructions stored in the memory and executable by the processor to cause the apparatus to:
      receive, from a base station, a downlink control information message scheduling a first message transmitted using an unencoded uplink signal from the UE to the base station, wherein the unencoded uplink signal is associated with a concurrent transmission with other unencoded uplink signals for averaging information while the unencoded uplink signal is transmitted;

transmit, using the unencoded uplink signal, the first message to the base station based at least in part on receiving the downlink control information message; and transmit, using an encoded uplink signal, a second message to the base station associated with the first message, the second message indicating that the downlink control information message was received.

15. The apparatus of claim 14, wherein the instructions to transmit the second message to the base station are executable by the processor to cause the apparatus to:

transmit an acknowledgement associated with the first message, the acknowledgement indicating that the first message was transmitted.

16. The apparatus of claim 14, wherein the instructions to transmit the second message to the base station are executable by the processor to cause the apparatus to:

transmit an acknowledgement associated with the downlink control information message, the acknowledgement indicating that the downlink control information message was received.

17. The apparatus of claim 14, wherein the instructions to transmit the second message to the base station are executable by the processor to cause the apparatus to:

transmit one or more coefficient indexes associated with information included in the first message.

18. The apparatus of claim 14, wherein the instructions are further executable by the processor to cause the apparatus to:

determine that one or more coefficients associated with information included in the first message were not transmitted to the base station, wherein the second message comprises an indication of one or more coefficient indexes corresponding to the one or more coefficients that were not transmitted to the base station.

19. The apparatus of claim 18, wherein the instructions are further executable by the processor to cause the apparatus to:

truncate the one or more coefficients from the first message based at least in part on a power limitation of the UE, wherein determining that the one or more coefficients were not transmitted to the base station is based at least in part on truncating the one or more coefficients from the first message.

20. The apparatus of claim 14, wherein the instructions are further executable by the processor to cause the apparatus to:

determine a resource allocation for transmitting the second message based at least in part on receiving the downlink control information message, wherein transmitting the second message to the base station is based at least in part on determining the resource allocation.

21. The apparatus of claim 20, wherein the instructions are further executable by the processor to cause the apparatus to:

transmit, to the base station, a scheduling request associated with the second message; and receive, from the base station, an indication of the resource allocation for transmitting the second message based at least in part on transmitting the scheduling request, wherein determining the resource allocation is based at least in part on receiving the indication of the resource allocation.

22. The apparatus of claim 20, wherein the instructions are further executable by the processor to cause the apparatus to:

transmit, to the base station, a medium access control (MAC) control element associated with the second message; and receive, from the base station, an indication of the resource allocation for transmitting the second message based at least in part on transmitting the MAC control element, wherein determining the resource allocation is based at least in part on receiving the indication of the resource allocation.

23. The apparatus of claim 20, wherein the instructions to determine the resource allocation for transmitting the second message are executable by the processor to cause the apparatus to:

determine the resource allocation based at least in part on the downlink control information message; or determine an uplink resource based at least in part on a configuration.

24. The apparatus of claim 20, wherein the resource allocation comprises a resource element group corresponding to the UE.

25. The apparatus of claim 20, wherein the resource allocation comprises a resource of a physical uplink control channel or a resource of a physical uplink shared channel, or a combination thereof.

26. The apparatus of claim 14, wherein the instructions to transmit the second message are executable by the processor to cause the apparatus to:

transmit a first part of the second message over a first set of resources; and transmit a second part of the second message over a second set of resources.

27. The apparatus of claim 26, wherein the instructions are further executable by the processor to cause the apparatus to:

receive an indication of the second set of resources based at least in part on transmitting the first part of the second message over the first set of resources, wherein the first part of the second message indicates a size of the second part of the second message.

28. The apparatus of claim 26, wherein the first part of the second message comprises an indication of a quantity of one or more coefficients associated with information of the first message and the second part of the second message comprises one or more coefficient indexes corresponding to the one or more coefficients.

29. The apparatus of claim 14, wherein the unencoded uplink signal comprises an over-the-air computation signal.

30. The apparatus of claim 14, wherein the unencoded uplink signal is transmitted without applying an error correcting code.

* * * * *